United States Patent
Shibata et al.

[11] Patent Number: 6,032,490
[45] Date of Patent: Mar. 7, 2000

[54] MOLD FOR FABRICATING OPTICAL FIBER GUIDE BLOCK

[75] Inventors: Gakuei Shibata; Teruo Yamashita, both of Tokyo; Masahiro Yoshida, Saitama, all of Japan

[73] Assignee: Hoya Corporation, Tokyo, Japan

[21] Appl. No.: 09/042,947

[22] Filed: Mar. 17, 1998

[30] Foreign Application Priority Data

Mar. 17, 1997 [JP] Japan ........................... 9-062796
Jan. 29, 1998 [JP] Japan ........................... 10-017266

[51] Int. Cl.[7] ............................ C03B 40/02; A01J 21/00
[52] U.S. Cl. ......................... 65/169; 65/168; 65/170; 65/374.11; 65/374.12; 425/90; 425/436 R; 425/469
[58] Field of Search .................. 65/168, 169, 170, 65/374.11, 374.12; 425/90, 436 R, 469

[56] References Cited

U.S. PATENT DOCUMENTS 5,425,118  6/1995  Sugihara et al. ..................... 385/51

FOREIGN PATENT DOCUMENTS

| | | |
|---|---|---|
| 0 410 181 | 1/1991 | European Pat. Off. . |
| 0 420 168 | 4/1991 | European Pat. Off. . |
| 0 667 543 | 8/1995 | European Pat. Off. . |
| 34 28 092 | 2/1986 | Germany . |
| 55-048716 | 4/1980 | Japan . |
| 694945 | 4/1994 | Japan . |
| 6201936 | 7/1994 | Japan . |
| 08197407 | 8/1996 | Japan . |
| 8211244 | 8/1996 | Japan . |
| 90 04196 | 4/1990 | WIPO . |

*Primary Examiner*—Sean Vincent
*Attorney, Agent, or Firm*—Sughrue, Mion, Zinn, Macpeak & Seas, PLLC

[57] ABSTRACT

In a grindstone for fabricating a mold which has optical fiber engagement portions of an optical fiber guide block used for aligning optical fibers, two main grinding surfaces are provided to form the optical fiber engagement portions contacted with the sides of the optical fibers and a tip end portion which is contiguous to the two main grinding surfaces and which has a contour contained within a predetermined area. The predetermined area has a triangle shape which is defined by two tangent lines along the two main grinding surfaces and a preselected line drawn between two points determined on the two main grinding surfaces. The two points are decided in accordance with a predetermined formula.

27 Claims, 18 Drawing Sheets

TWO-POINT SUPPORT CONDITION: $d_{min} \cdot \tan(\theta/2) = Y_0 - R_0 \cdot \tan((\pi - \theta)/4)$ R=Rmax

MOLD FOR FABRICATING OPTICAL FIBER GUIDE BLOCK

BACKGROUND OF THE INVENTION

1. Field of the Invention

The present invention relates to a grindstone, a method of fabricating molds for fabricating optical fiber guide blocks, molds for fabricating optical fiber guide blocks, and an optical fiber guide block fabrication method, for the purpose of fabricating molds for fabricating optical fiber guide blocks capable of holding and securing the ends of optical fibers in a condition wherein their ends are positioned with high precision and secured.

2. Description of the Related Art

Optical fiber guide blocks which have optical fiber engagement portions are known as securing members for positioning and aligning multifibers at predetermined intervals with high location accuracy. In Japanese Unexamined Patent Publications Nos. Hei 6-201936 [201936/1994] and Hei 8-211244 [211244/1996], for example, optical fiber guide blocks are disclosed which are obtained by forming glass in a hot press. In Japanese Unexamined Patent Publication No. Hei 6-94945 [94945/1994] is disclosed an optical fiber guide block obtained by press-molding resin.

(1) In then past, the forming parts of optical fiber engagement portions in molds have been formed by dividing the forming surfaces a number of times and grinding a little at a time with grindstones that are very small compared to the size of the work. With this method, in addition to requiring much time for the machining, it is very difficult to make multifiber engagement portion forming, parts with high precision, and so that the cross-sectional shape is always the same shape. As a consequence, a shape is varied in configuration when observation is made about the perpendicular cross-sectional shape along the longitudinal dimension of one forming part, or when cross-sectional shapes of different forming parts are compared with each other.

(2) Also, in fabricating optical arrays, the optical fiber ends are engaged and lined up in optical fiber engagement portions in an optical fiber guide block, and pressure blocks are used to press down on and secure the optical fiber ends. In order to position and secure the optical fiber ends with high location accuracy, it is necessary that the optical fiber sides be supported, at two points by V-shaped optical fiber engagement portions in the optical fiber guide block, in a cross-section seen from a direction perpendicular to the optical axis of the optical fiber ends secured, and at one point by the pressure surface of the pressure block. In the absence of such a three-point support condition, clearances (gaps) will develop between the sides of the optical fiber, on the one hand, and the optical fiber engagement portions or the pressure surface of the pressure block, on the other hand, making it very difficult to implement holding and securing with high location accuracy.

In order to perform optical fiber end securing by the three-point support as described above, when an optical fiber is engaged in an optical fiber engagement portion, not only must the optical fiber engagement portion exhibit a shape wherewith the optical fiber can be stably engaged, but the condition must be such as to permit a portion of the side of the optical fiber to expose its crown, standing away from the optical fiber engagement portion, without being imbedded in the middle of the optical fiber engagement portion. In order to fabricate optical fiber guide blocks having the shape described above by press-molding, a specially shaped mold made to high precision is necessary. Until now, however, no such mold, nor any method for fabricating such mold, has been known.

Furthermore, if the mold can align multifiber ends with a location accuracy within the allowable range, then, on an exceptional basis, a condition wherein optical fiber crown exposure cannot be effected is permissible, but no such mold as this or method for fabricating such mold as this is known either.

SUMMARY OF THE INVENTION

It is therefore an object of the present invention is to provide a grindstone for fabricating molds for optical fiber guide blocks, a fabrication method suitable for fabricating molds for fabricating optical fiber guide blocks for the purpose of fabricating optical fiber guide blocks by press-molding that make it possible to position and secure optical fibers with high location accuracy for the purpose, of fabricating molds for fabricating optical fiber guide blocks, and such molds, and also to provide a method for fabricating optical fiber guide blocks wherewith it is possible to position and secure optical fibers with high location accuracy using the molds described in the foregoing.

It is another object of the present invention to provide a grindstone wherewith it is possible to position and align multifiber ends with high location accuracy within the allowable range, even in a condition wherein the optical fibers are imbedded in the optical fiber engagement portions so that they cannot expose their crowns, a method of fabricating molds for fabricating optical fiber guide blocks, and a method of fabricating both molds for fabricating optical fiber guide blocks and the optical fiber guide blocks.

According to a first aspect of the present invention, there is provided a grindstone for fabricating a mold for molding by press-molding process at least the optical fiber engagement portions of an optical fiber guide block that has optical fiber engagement portions for the purpose of positioning and aligning optical fibers at a fixed pitch; comprising: two main grinding surfaces that machine formed surfaces that support the sides of the optical fiber; and a shape wherein the angle θ subtended by the two tangent lines which touch the two main grinding surfaces in a cross-section perpendicular to the main grinding surfaces constitutes an angle that is equal to or smaller than θc which satisfies the relationship noted below; and the contour of the tip that connects the two main grinding surfaces is contained within an area bounded by the two tangent lines and by a line that is tangent to an imaginary circle and perpendicular to the straight line connecting the intersection of the two tangent lines with the center of the imaginary circle, and that passes between the intersection and the center of the imaginary circle, when the imaginary circle, of radius Rmin as noted below, is inscribed in the area that is in the bight of the two tangent lines.

$$\theta c = 2 \tan^{-1}\{(S^2-1)/2S\}$$

where:

$$\text{Rmin} = [\text{RO} + \{\text{RO}/\sin(\theta/2)\} - \{\text{YO}/\tan(\theta/2)\}]/[1-\{1/\sin(\theta/2)\}],$$

RO is the optical fiber radius, and

YO is half the pitch length of the optical fiber engagement portion.

According to a second aspect of the present invention, there is provided a grindstone for fabricating a mold for molding by press-molding process at least the optical fiber engagement portion(s) of an optical fiber guide block that has (a) groove-shaped optical fiber engagement portion(s) for the purpose of positioning optical fibers; comprising: two main grinding surfaces that machine formed surfaces that support the sides of the optical fiber; and a shape wherein the angle θ subtended by the two tangent lines which touch the two main grinding surfaces in a cross-section perpendicular to the main grinding surfaces constitutes an angle that is not greater than θc which satisfies the relationship noted below; and the contour of the tip that connects the two main grinding surfaces is contained within an area bounded by the two tangent lines and by a line that is tangent to an imaginary circle and perpendicular to the straight line connecting the intersection of the two tangent lines with the center of the imaginary circle, and that passes between the intersection and the center of the imaginary circle, when the imaginary circle, of radius Rmin as noted below, is inscribed in the area that is in the bight of the two tangent lines.

$$\theta c = 2 \tan^{-1}\{S^2-1)/2S\}$$

where:

$$Rmin=[RO+\{RO/\sin(\theta/2)\}-\{YO/\tan(\theta/2)\}]/[1-\{1/\sin(\theta/2)\}],$$

RO is the optical fiber radius, and

YO is the interval between the concavities when at least two groove-shaped concavities are formed by the grindstone in a mold material that is to be the mold, so as to form the optical fiber engagement portion(s) between the concavities.

The first aspect according to the present invention comprises optical fiber engagement portions that position and align optical fibers at a fixed pitch, with the restriction being that the optical fiber engagement portions are plural in number and arranged at equal intervals. The second aspect of the invention, however, comprises groove-shaped optical fiber engagement portions for the purpose of positioning the optical fibers, wherefore the optical fiber engagement portion may be singular in number, and also included are those which are not arranged at equal intervals. When there is a single optical fiber engagement portion, there is no such concept as the pitch of the optical fiber engagement portions. However, even with mold used where there is a single optical fiber engagement portion, at least two B-2's must be formed in FIG. 8E, so the interval between the two B-2's is defined as 2YO.

According to a third aspect of the present invention, there is provided a grindstone that, in the first and the second aspects of the present invention, has Rmin*, which satisfies the relationship noted below, in place of Rmin.

$$Rmin^*=Rmin-(\phi/5)$$

where:

φ is the optical fiber core diameter.

According to a fourth aspect of the present invention, there is provided a grindstone for fabricating a mold for molding by press-molding process at least the optical fiber engagement portions of an optical fiber guide block that has optical fiber engagement portions for the purpose of positioning and aligning optical fibers at a fixed pitch; comprising: two main grinding surfaces that machine formed surfaces that support the sides of the optical fiber; wherein the angle θ subtended by the two tangent lines in a cross-section perpendicular to the main grinding surfaces constitutes an aangle that exceeds θc which satisfies the relationship noted below.

$$\theta c = 2 \tan^{-1}\{(S^2-1)/2S\}$$

where:

S=YO/RO,

RO is the optical fiber radius, and

YO is half the pitch length of the optical fiber engagement portion.

According to a fifth aspect of the present invention, there is provided a grindstone for fabricating a mold for molding by press-molding process at least the optical fiber engagement portion(s) of an optical fiber guide block that has (a) groove-shaped optical fiber engagement portion(s) for the purpose of positioning optical fibers; comprising: two main grinding surfaces that machine formed surfaces that support the sides of the optical fiber; wherein the angle θ subtended by the two tangent lines in a cross-section perpendicular to the main grinding surfaces constitutes an angle that exceeds θc which satisfies the relationship noted below.

$$\theta c = 2 \tan^{-1}\{(S^2-1)/2S\}$$

where:

S=YO/RO,

RO is the optical fiber radius, and

YO is the interval between the concavities when at least two groove-shaped concavities are formed by the grindstone in a mold material that is to be the mold, so as to form the optical fiber engagement portion(s) between the concavities.

According to a sixth aspect of the present invention, there is provided a method of fabricating a mold for fabricating an optical fiber guide block; wherein the mold is for the purpose of molding by press-molding process at least the optical fiber engagement portions of the optical fiber guide block, the optical fiber guide block comprising: a plurality of optical fiber engagement portions for the purpose of positioning and aligning optical fibers; comprising: a machining process for using a grindstone to grind a plurality of grooves in a mold material which extend in the longitudinal dimension thereof; wherein the interval between the grooves is made the forming part for the optical fiber engagement portions; and the contour of that portion of the forming part which forms the portions that are to support at least the optical fibers forms a portion of the contour shape of the grindstone.

If this method is employed, by performing grinding-machining so that a portion of the contour shape of the grindstone is formed in the shape of that portion of the cross-section of the optical fiber engagement portion forming parts that are to support the optical fiber, it is possible to fabricate molds, with high productivity, so that the cross-sectional shapes of the multifiber engagement portion forming parts are the same. In other words, it is possible, using a single grindstone, to form grooves of the same shape in the mold material, based on the standard shape of the grindstone, and thereby to machine the parts that form the optical fiber engagement portions. As a consequence, it is possible to form multiple portions having the same shape to a high precision, and to do this in an elegant manner.

According to a seventh aspect of the present invention, there is provided a method of fabricating a mold for fabricating an optical fiber guide block, for the purpose of molding by press-molding process at least the optical fiber engagement portions of the optical fiber guide block; the optical fiber guide block comprising: (an) optical fiber engagement portion(s) for the purpose of positioning and aligning optical fibers at a fixed pitch; wherein the grindstone of one of the aspects of the present inventions cited above, namely the first through the fifth invention, is used;

and concavities extending in a prescribed direction, of such depth that the intersection between the two tangent lines will be at a position deeper than dmin, as defined below, are formed, by a grinding process, on the flat surface of the mold material, at the pitch noted above, in a direction perpendicular to the prescribed direction noted above, in a number that is the number of the optical fiber engagement portions plus 1.

$$dmin=[YO-RO\cdot\tan\{(\pi-\theta)/4\}]/\tan(\theta/2)$$

According to an eighth aspect of the present invention, there is provided a method of fabricating a mold for fabricating an optical fiber guide block, for the purpose of molding by press-molding process at least the optical fiber engagement portions of said optical fiber guide block; the optical fiber guide block comprising: (a) groove-shaped optical fiber engagement portion(s) for the purpose of positioning optical fibers; wherein the grindstone of one of the aspects of the present invention cited above, namely the first through the fifth aspects of the present invention, is used; and a plurality of concavities extending in a prescribed direction, of such depth that the intersection between the two tangent lines will be at a position deeper than dmin, as defined below, are formed, by a grinding process, on the flat surface of the mold material, in a direction perpendicular to the prescribed direction noted above, and such that the interval between at least two of these concavities becomes YO.

$$dmin=[YO-RO\cdot\tan\{(\pi-\theta)/4\}]/\tan(\theta/2)$$

According to a ninth aspect of the present invention, there is provided a method of fabricating a mold for fabricating an optical fiber guide block, wherein in the seventh or eighth aspects of the present invention, concavities are machined at a depth such that the intersection between the two tangent lines becomes a position that is shallower than dmax, as defined below.

$$dmax=YO/\tan(\theta/2)$$

According to a tenth aspect of the present invention, there is provided a method of fabricating a mold for fabricating an optical fiber guide block, comprising: a process for machining such that, after grinding-machining the concavities of the seventh, eighth, or ninth aspect of the present invention, outside of the two grooves positioned outermost among the grooves, the portions which connect to the bottoms of at least those two grooves are in the same plane as the bottoms of those two grooves.

According to an eleventh aspect of the present invention, there is provided a mold for fabricating an optical fiber guide block that has been fabricated by one of the methods cited in the sixth through the tenth aspects of the present invention.

According to a twelfth aspect of the present invention, there is provided a mold for fabricating an optical fiber guide block, for the purpose of molding, by press-molding process, at least the optical fiber engagement portions of an optical fiber guide block comprising optical fiber engagement portions for the purpose of positioning and aligning optical fibers at a fixed pitch: comprising: a plurality of concavities that extend in one direction in the forming surface; wherein: the tangent lines at the points where the portions that are to support the optical fiber at the two sloping surfaces which configure the concavities, in a cross-section that is perpendicular to the longitudinal dimension of the concavities, subtend an angle $\theta$ that is equal to or smaller than $\theta c$ which satisfies the relationship noted below; the perpendicular cross-sectional shape of the concavities is such that the contour thereof is contained within an area bounded by the two tangent lines that touch the sloping surfaces and by a line that is tangent to an imaginary circle and perpendicular to the straight line connecting the intersection of the two tangent lines with the center of the imaginary circle, and that passes between the intersection and the center of the imaginary circle, when the imaginary circle, of radius Rmin as defined below, is inscribed in the area that is in the bight of the two tangent lines; the depth of the concavities is such that the intersection of the two tangent lines is at a position deeper than dmin, as defined below; and the forming surfaces between the concavities are what form the optical fiber engagement portions.

$$\theta c=2\tan^{-1}\{(S^2-1)/2S\}$$

where:

S=YO/RO, $$Rmin=[RO+\{RO/\sin(\theta/2)\}-\{YO/\tan(\theta/2)\}]/[1-\{1/\sin(\theta/2)\}],$$

$$dmin=[YO-RO\cdot\tan\{(\pi-\theta)/4\}]/\tan(\theta/2),$$

RO is the optical fiber radius, and

YO is half the pitch length of the optical fiber engagement portion.

According to a thirteenth aspect of the present invention, there is provided the mold for fabricating an optical fiber guide block in the twelfth aspect of the present invention, wherein the cross-sectional shapes perpendicular to the longitudinal dimension of a plurality of concavities are the same.

According to a fourteenth aspect of the present invention, there is provided a mold for fabricating an optical fiber guide block, for the purpose of molding, by press-molding process, at least the optical fiber engagement portions of an optical fiber guide block that comprises groove-shaped optical fiber engagement portions for the purpose of positioning optical fibers; comprising: convexities that extend in the longitudinal dimension of the forming surface; and concavities that extend in the longitudinal dimension, arrayed with the convexities sandwiched in between them; wherein: the tangent lines at the points where are formed the portions of the two sloping surfaces that configure the concavities in a cross-section perpendicular to the longitudinal dimension of the concavities, which portions are to support the optical fibers, subtend an angle $\theta$ that is equal to or smaller than $\theta c$ which satisfies the relationship noted below; the perpendicular cross-sectional shape of the concavity or concavities is such that the contour thereof is contained within an area bounded by the two tangent lines that touch the sloping surfaces and by a line that is tangent to an imaginary circle andperpendicular to the straight line connecting the intersection of the two tangent lines with the center of the imaginary circle, and that passes between the intersection and the center of the imaginary circle, when the imaginary circle, of radius Rmin as defined below, is inscribed in the area that is in the bight of the two tangent lines; the depth of the concavities is such that the intersection of the two tangent lines is at a position deeper than dmin, as defined below; and one or other of the sloping surfaces that form the concavity or concavities is what forms the surface(s) that support(s) the optical fibers in the optical fiber engagement portion(s).

$$\theta c=2\tan^{-1}\{(S^2-1)/2S\}$$

where:
    YO/RO, $$R_{min}=[RO+\{RO/\sin(\theta/2)\}-\{YO/\tan(\theta/2)\}][/1-\{1/\sin(\theta/2)\}],$$

$$d_{min}=(YO-RO\cdot\tan\{(\pi-\theta)/4\})/\tan(\theta/2),$$

RO is the optical fiber radius, and
2YO is the interval between the concavities arrayed so as to sandwich the convexities between them.

According to a fifteenth aspect of the present invention, there is provided the mold for fabricating an optical fiber guide block in the fourteenth aspect of the present invention, wherein the cross-sectional shapes perpendicular to the longitudinal dimension of the concavity or concavities are the same.

According to a sixteenth aspect of the present invention, there is provided the mold for fabricating an optical fiber guide block in the twelfth through the fifteenth aspects of the present invention, having, in place of Rmin, Rmin* which satisfies the relationship noted below.

$$R_{min}^*=R_{min}-(\phi/5)$$

where:
    φ is the optical fiber core diameter.

According to a seventeenth aspect of the present invention, there is provided a mold for fabricating an optical fiber guide block, for the purpose of molding, by press-molding process, at least the optical fiber engagement portions of an optical fiber guide block comprising optical fiber engagement portions for the purpose of positioning and aligning optical fibers at a fixed pitch; comprising: a plurality of concavities that extend in one direction in the forming surface; wherein: the tangent lines at the points where the portions that are to support the optical fiber at the two sloping surfaces which configure the concavities, in a cross-section that is perpendicular to the longitudinal dimension of the concavities, subtend an angle θ that exceeds θc which satisfies the relationship noted below; the depth of the concavities is such that the intersection of the tangent lines is at a position deeper than dmin, as defined below; and the forming surfaces between the concavities are what forms the optical fiber engagement portions.

$$\theta c=2\tan^{-1}\{S^2-1)/2S\}$$

where:
    S=YO/RO, $$d_{min}=[YO-RO\cdot\tan\{(\pi-\theta)/4\}]/\tan(\theta/2),$$

RO is the optical fiber radius, and
YO is half the pitch length of the optical fiber engagement portion.

According to an eighteenth aspect of the present invention, there is provided the mold for fabricating an optical fiber guide block in the seventeenth aspect of the present invention, wherein the cross-sectional shapes perpendicular to the longitudinal dimension of a plurality of concavities are the same.

According to a nineteenth aspect of the present invention, there is provided a mold for fabricating an optical fiber guide block, for the purpose of molding, by press-molding process, at least the optical fiber engagement portions of an optical fiber guide block that comprises groove-shaped optical fiber engagement portions for the purpose of positioning and supporting optical fibers; comprising: convexities that extend in the longitudinal dimension of the forming surface; and concavities that extend in the longitudinal dimension, arrayed with the convexities sandwiched in between them; wherein: the tangent lines at the points where are formed the portions of the two sloping surfaces that configure the concavities in a cross-section perpendicular to the longitudinal dimension of the concavities, which portions are to support the optical fibers, subtend an angle θ that exceeds θc which satisfies the relationship noted below; the depth of the concavities is such that the intersection of the tangent lines is at a position deeper than dmin, as defined below; and one or other of the sloping surfaces that form the concavity or concavities is what forms the surface(s) that support(s) the optical fibers in the optical fiber engagement portion(s).

$$\theta c=2\tan^{-1}\{S^2-1)/2S\}$$

where:
    S=YO/RO, $$d_{min}=[YO-RO\cdot\tan\{(\pi-\theta)/4\}]/\tan(\theta/2),$$

RO is the optical fiber radius, and
2YO is the interval between the concavities arrayed so as to sandwich the convexities between them.

According to a twentieth aspect of the present invention, there is provided the mold for fabricating an optical fiber guide block in the nineteenth aspect of the present invention, wherein the cross-sectional shapes perpendicular to the longitudinal dimension of the concavity or concavities are the same.

According to a twenty-first aspect of the present invention, there is provided the mold for fabricating an optical fiber guide block in the twelfth through the twentieth aspect of the present invention, wherein the shapes of the bottoms of the concavities in a cross-section perpendicular to the longitudinal dimension of the concavities are the same.

According to a twenth-second aspect of the present invention, there is provided the mold for fabricating an optical fiber guide block in the twelfth through the twentieth aspects of the present invention, wherein the bottoms of the concavities are flat.

According to a twenty-third aspect of the present invention, there is provided the mold for fabricating an optical fiber guide block in the twelfth through the twenty-second invention, comprising: a plurality of concavities, wherein: the forming surfaces bounded between the concavities are flat; and the flat surfaces are positioned in the same plane.

According to a twenty-fourth aspect of the present invention, there is provided the mold for fabricating an optical fiber guide block in the twelfth through the twenty-third aspects of the present invention, having a mold release thin film(s), at least on the forming surface.

According to a twenth-fifth aspect of the present invention, there is provided a method of fabricating optical fiber guide blocks wherein: a mold for fabricating an optical fiber guide block in the twelfth through the twenty-fourth aspects of the present inventions is used; and the raw material to be molded is press-molded under heat.

DESCRIPTION OF PREFERRED EMBODIMENTS

The present invention will now be described specifically, using drawings as appropriate. Before that, however, the main parameters of the present invention will be briefly listed.

(1) Rmin is a crown-exposure condition (2) dmin is a condition for two-point support by an optical fiber engagement portion (3) when θ<θc, the grindstone tip shape becomes a problem (4) when Rmax is exceeded, θ cannot be guaranteed (when shape of grindstone tip is a circular arc)

(5) when dmax is exceeded, the mold becomes sharply pointed and breakable (6) Rmin≦R≦Rmax is to hold true.

Figure 3A:
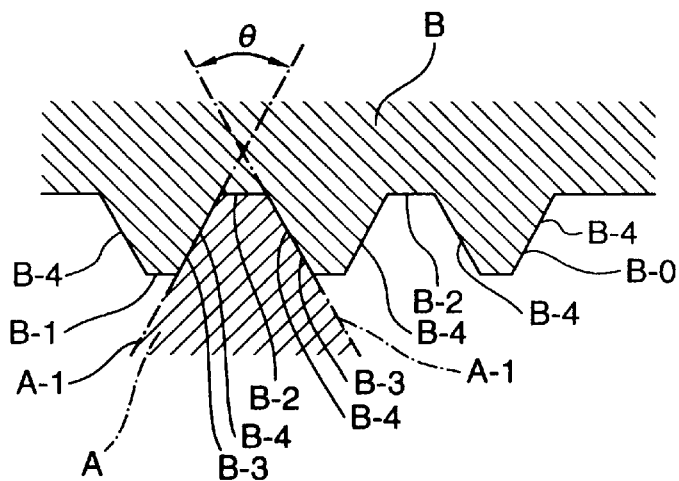
FIGS. 3A through 3C are a set of descriptive drawings of a mold, grindstone, and optical fiber guide block according to the embodiment, FIG. 3A being a cross-sectional view of a mold for molding optical fiber engagement portions, FIG. 3B being a view, seen as a cross-section perpendicular to the optical axis of optical fiber, of the vicinity of optical fiber engagement portions in an optical fiber guide block in a condition wherein optical fibers are engaged in the optical fiber engagement portions, and FIG. 3C being a view, seen in the perpendicular cross-section noted above, of a condition wherein optical fibers are engaged and aligned in V-shaped optical fiber engagement portions in an optical fiber guide block C.
Figure 3B:
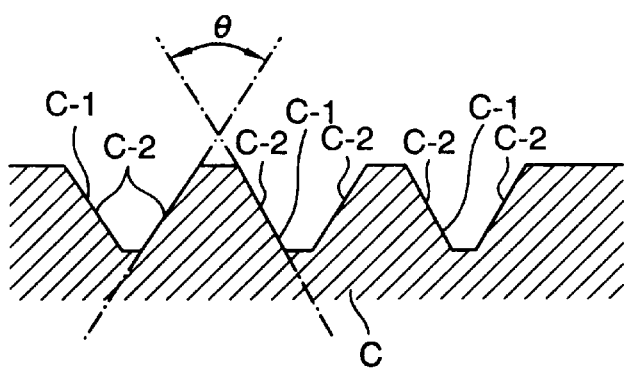
Figure 3C:
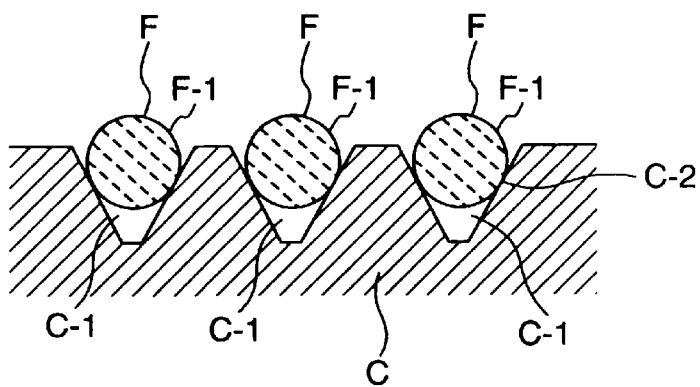

In FIG. 3C diagrammed a condition wherein optical fibers F are engaged and aligned in V-shaped optical fiber engagement portions C-1 in an optical fiber guide block C, as viewed in a cross-section that is perpendicular to the optical axis of the optical fiber. In FIG. 3B is depicted the vicinity of the optical fiber engagement portions in an optical fiber guide block in a condition wherein optical fibers are not engaged in the optical fiber engagement portions. And in FIG. 3A is given a cross-section of a mold B for molding the optical fiber engagement portions diagrammed in FIG. 3B. Here the concavities B-2 of the mold B are formed by grinding-machining using a grindstone A. This grindstone A comprises two main grinding surfaces A-1 which machine the forming surfaces B-0 (including points B-4) that form the surfaces that contain the points C-2 which support the optical fiber sides F-1. The main grinding surfaces A-1 grind the two sloping surfaces B-3 which form the concavities B-2 of the mold B in FIG. 3A. In a cross-section (in a plane parallel to the plane of the page) that is perpendicular to the two main grinding surfaces A-1 of the grindstone A, the angle subtended by the two main grinding surfaces A-1 is designated as θ.

Figures 4A, 4B, 4C:
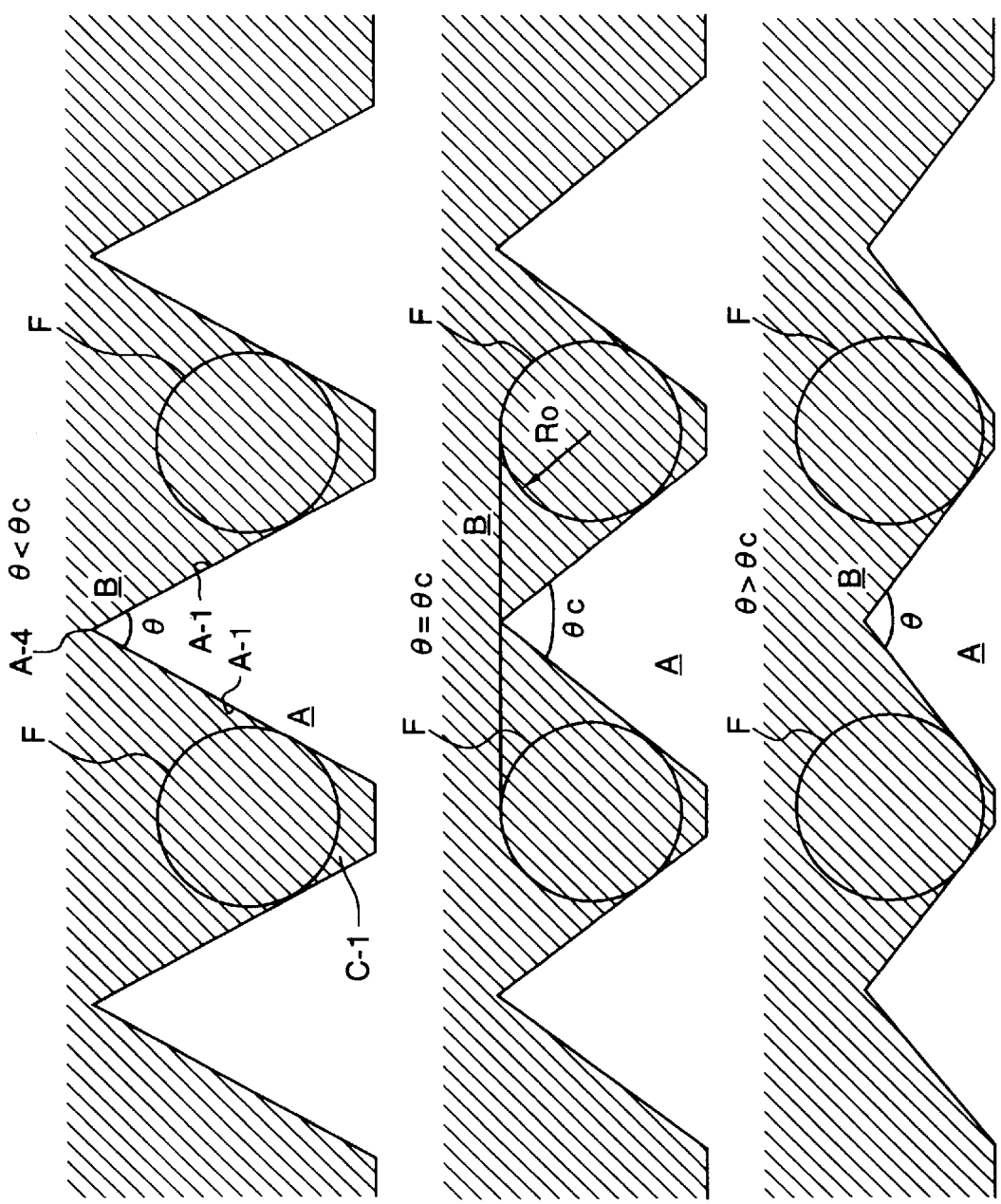
FIGS. 4A through 4C are an explanatory diagram that represents the height relationship between the intersection and the optical fiber crowns in optical fiber engagement portions as the value of the angle θ subtended by the tangent lines in the main grinding surfaces of the grindstone according to the embodiment is changed, FIG. 4A being a cross-sectional view for θ<θc, FIG. 4B being a cross-sectional view for θ=θc, and FIG. 4C being a-cross-sectional view for θ>θc.

FIGS. 4A through 4C diagram the height relationship between the intersection A-4 and the crowns of the optical fibers F in the optical fiber engagement portions C-1 as the angle θ subtended by the main grinding surfaces A-1 is changed. If we define θ=θc as the angle subtended when the crowns of the optical fibers F and the intersection A-4 coincide (FIG. 4B), then, when θ<θc, the optical fibers F will be further imbedded than the position of the intersection A-4 (FIG. 4A), and when θ>θc, they will emerge (FIG. 4C).

The relational formula for the angle θc is given below.

$$\theta c = 2 \tan^{-1}\{(S^2-1)/2S\}$$

where S=YO/RO,

RO is the optical fiber radius, and

Figure 5:
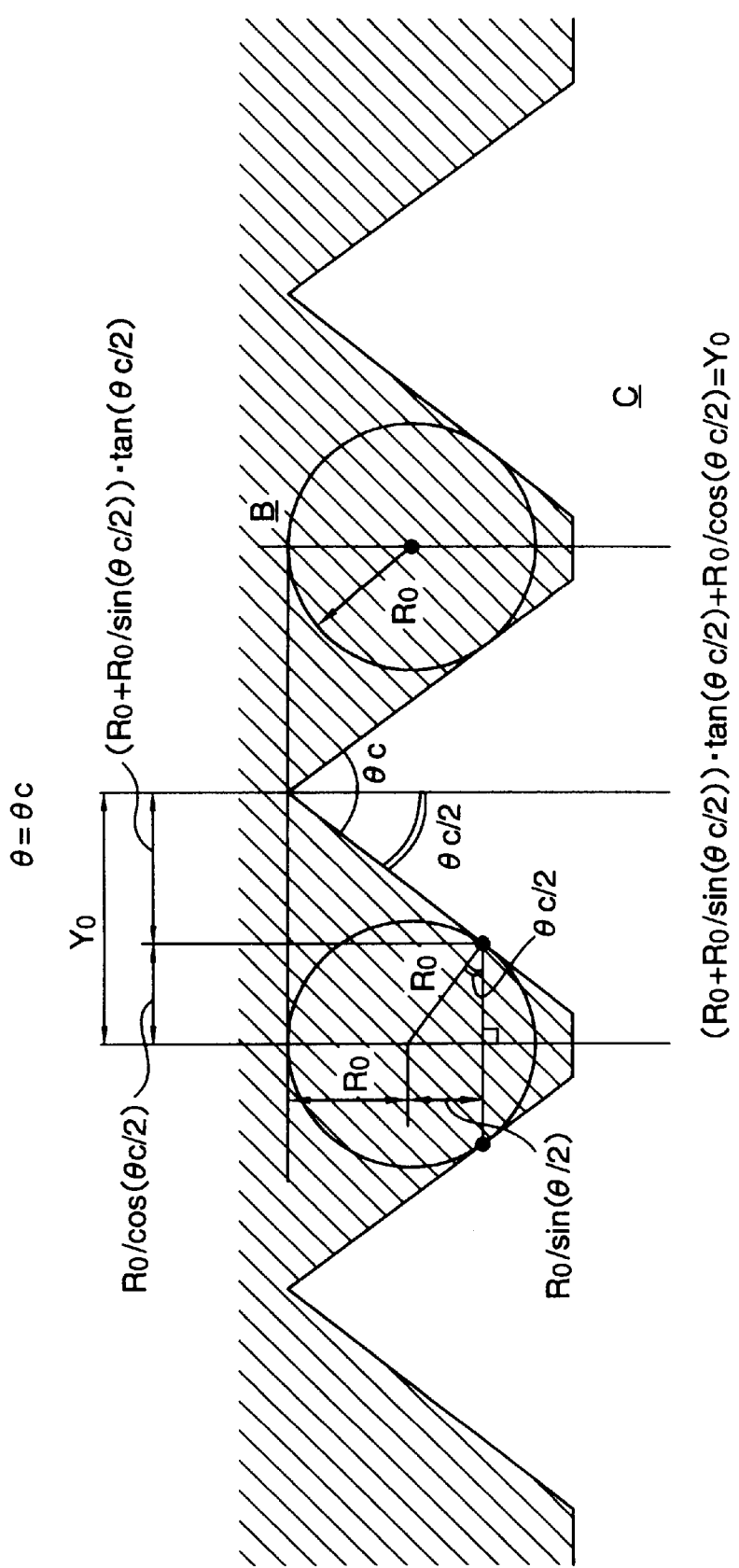
FIG. 5 is a cross-sectional view of the vicinity of concavities in a mold according to the embodiment when θ=θc.

YO is half the optical fiber engagement portion pitch length. This formula is readily derived from FIG. 5, which diagrams a cross-section of the vicinity of the concavities in the mold B with θ=θc.

When θ<θc  (1)

Figure 1:
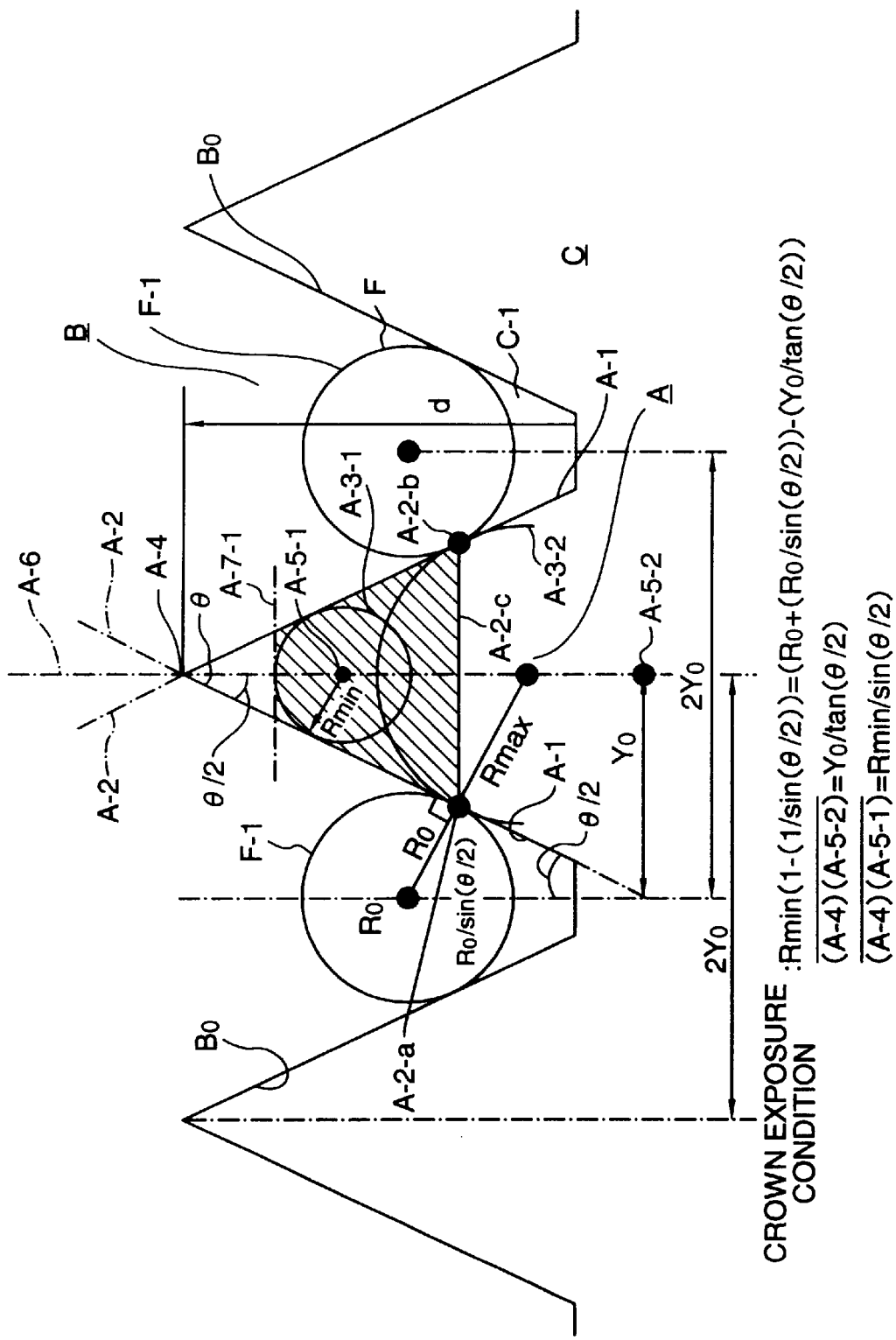
FIG. 1 is a cross-sectional view describing the correlations between the mold, grindstone, optical fiber, and optical fiber guide block indicating the optical fiber crown exposure conditions according to an embodiment of the present invention.

When a grindstone A wherein the angle θ is less than θc, satisfying the relational equation (1) above, is used, it is expedient to posit two tangent lines A-2 which, as depicted in FIG. 1, touch the main grinding surfaces A-1, and together subtend an angle θ in a cross-section perpendicular to the two main grinding surfaces A-1. The two tangent lines A-2 cross at the intersection A-4. Now, in the region between these two tangent lines A-1, a condition is supposed wherein an imaginary circle A-3-1 having radius Rmin, as defined below, is inscribed. Rmin is the minimum radius of curvature for the tip of the grindstone necessary for the optical fiber crown exposure.

$$Rmin=[RO+\{RO/\sin(\theta/2)\}-\{YO/\tan(\theta/2)\}]/[1-\{1/\sin(\theta/2)\}] \quad (2)$$

This formula (2) defines a critical condition for the crown exposure of the optical fibers F. It can be derived from the cross-sectional view of the mold in FIG. 1.

Figure 2A:
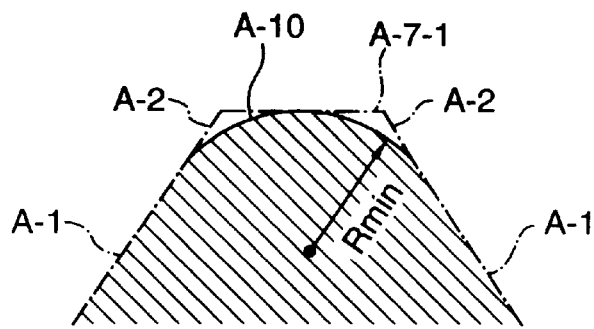
FIGS. 2A through 2D are a set of cross-sectional views describing the tip shape of grindstones according to the embodiment, FIGS. 2A and 2B depicting circular arc shapes, and FIGS. 2C and 2D depicting flat shapes.
Figure 2B:
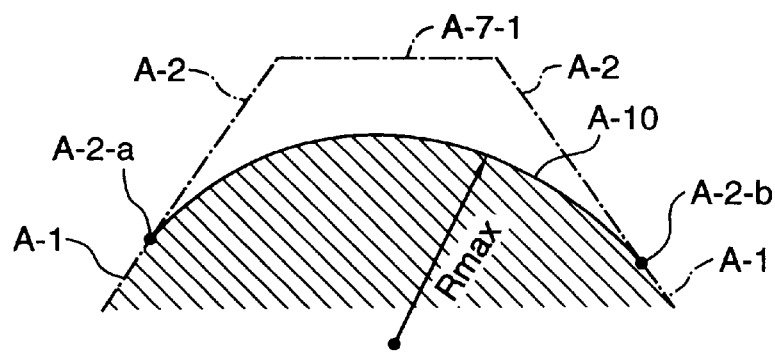
Figure 2C:
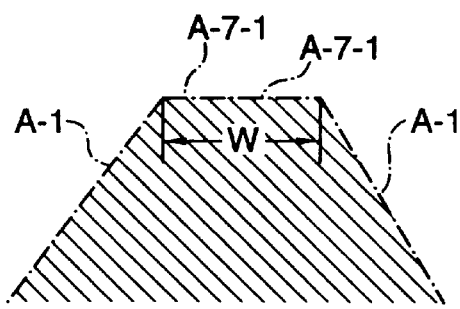
Figure 2D:
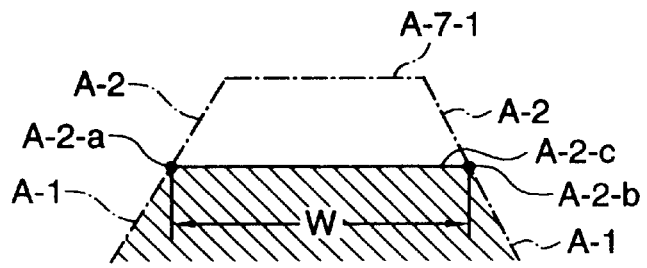

We next suppose a straight line A-6 that connects the intersection A-4 between the two tangent lines A-2 and the center A-5-1 of the imaginary circle A-3-1, and a tangent line A-7-1 of the imaginary circle A-3-1 that is perpendicular to the straight line A-6 and that passes between the intersection A-4 and the center A-5-1 of the imaginary circle A-3-1. The portion where the two main grinding surfaces A-1 connect in the cross-section of the grindstone A perpendicular to the two main grinding surfaces A-1 will be called the tip of the grindstone A, but the grindstone A that is used has a shape that comprises the contour of this tip within the area bounded by the two tangent lines A-2 and the tangent line A-7-1. This is for the purpose of exposing the crowns of the optical fibers F. More specifically, the grindstone A that is used contains the outline of the tip within the region (including the boundaries thereof) bounded, in FIG. 1, by the straight line A-2-c that connects the points A-2-a and A-2-b, the two tangent lines A-2, and the tangent line A-7-1 (the cross-hatched region in FIG. 1). Such grindstones A include those wherein the cross-sectional shape described is such that the cross-section of the tip is a circular arc A-10, as diagrammed in FIGS. 2A and 2B, and wherein it is such that the tip is flat, as at A-11, as diagrammed in FIGS. 2C and 2D.

When the grindstone tip has a cross-sectional shape that is defined by a circular arc, the aforementioned conditions relative to the grindstone tip shape can be expressed in different terms, as follows. A condition is supposed wherein an imaginary circle A-3-2 of radius Rmax, as defined below, is inscribed in the area bounded by the two tangent lines A-2, as diagrammed in FIG. 1. Rmax is the maximum radius of curvature for the grindstone tip that can guarantee θ.

$$Rmax=\{YO-RO\cos(\theta c/2)\}/\cos(\theta c/2) \quad (3)$$

Figure 6:
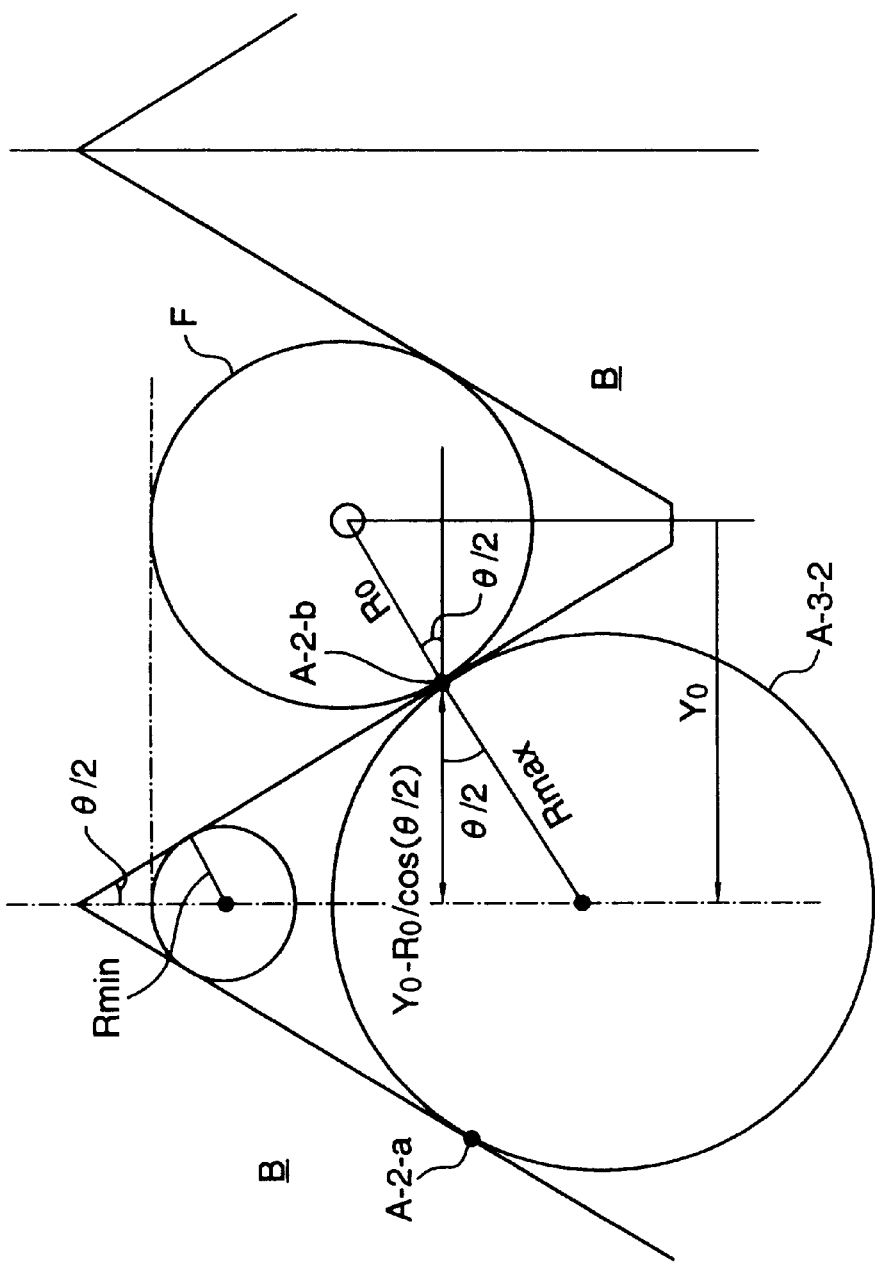
FIG. 6 is an-explanatory diagram for deriving Rmax according to the embodiment.

This formula indicates the radius of the circle A-3-2 that touches a circle of radius RO at the tangent line A-2. Its derivation may be understood from FIG. 6 which diagrams a cross-section of the mold.

In order to expose the crowns of the optical fibers F while guaranteeing θ, it is necessary that the radius of curvature of the grindstone tip satisfy the expression Rmin≦R≦Rmax.

Figure 7A:
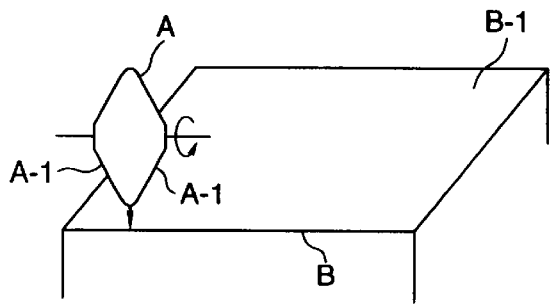
FIGS. 7A, 7B, 7C, 7D and 7E are a set of diagonal views depicting machining processes for fabricating a mold from a mold material by grinding with a grindstone according to the embodiment.
Figure 7B:
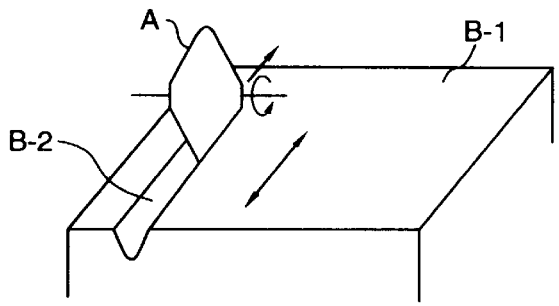

A process wherein a grindstone A of such a shape is used to fabricate, by grinding-machining, a mold B, from a mold material, will now be described. FIGS. 7A through 7E provide diagonal views of the machining process. FIGS. 8A through 8E provide corresponding cross-sectional views of the process depicted in the diagonal views. First a concavity B-2 is ground by a grindstone A of the shape noted above, in the flat surface B-1 of a mold materialsB (FIGS. 7A and 7B). At this time, the depth of the concavity B-2 is made such that the position of the intersection A-4 is a position that is deeper than dmin, defined below, so that the optical fiber sides F-1 will be supported at two points by the optical fiber engagement portions C-1 of the optical fiber guide block C (FIG. 8E). This is to provide two-point support.

$$dmin=[YO-RO\cdot\tan\{(\pi-\theta)/4\}]/\tan(\theta/2) \quad (4)$$

Figure 10:
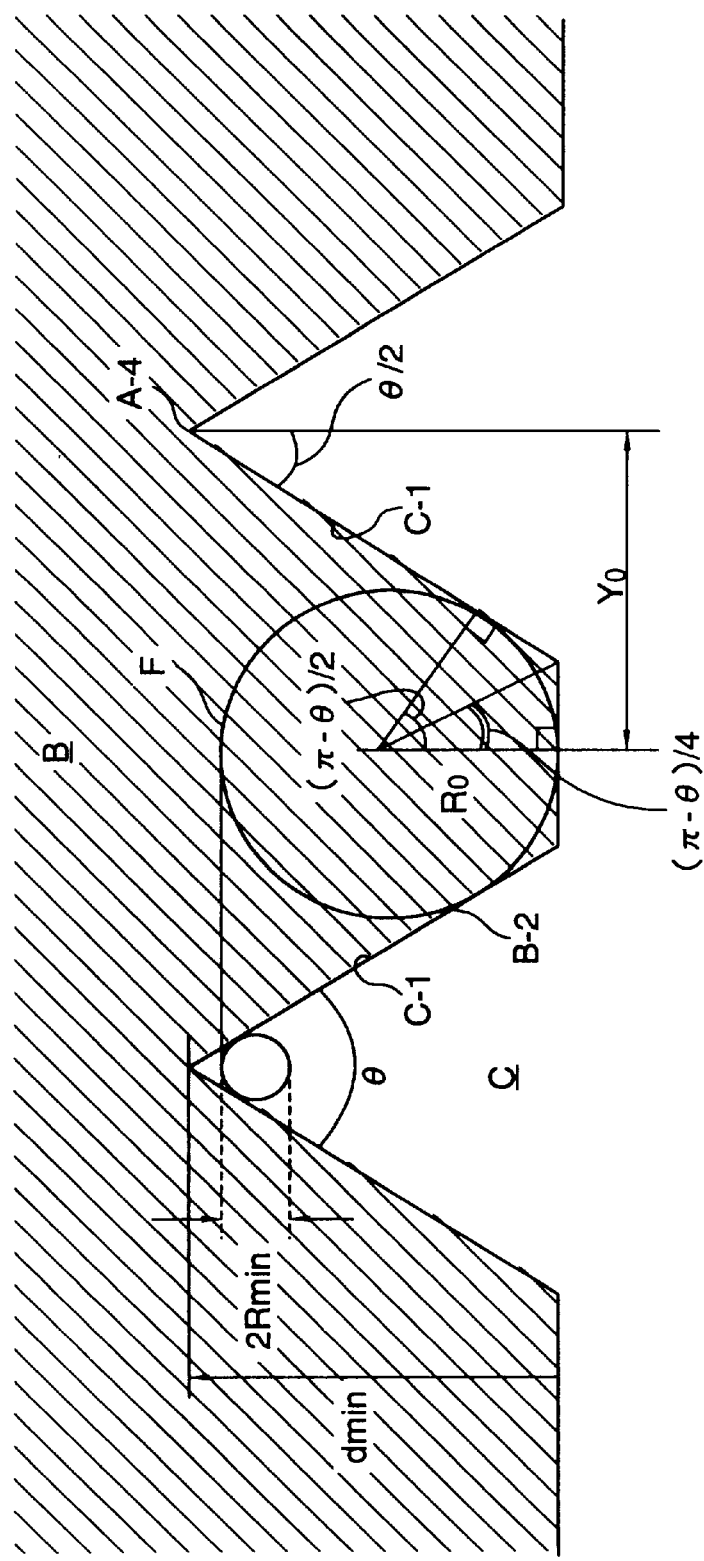
FIG. 10 is an explanatory diagram for deriving dmin according to the embodiment.

This formula (4) is easily derived from FIG. 10 which represents the case where d=dmin, the condition necessary for the optical fiber F to touch the bottom of the concavity B-2 of the mold B.

Figure 7C:
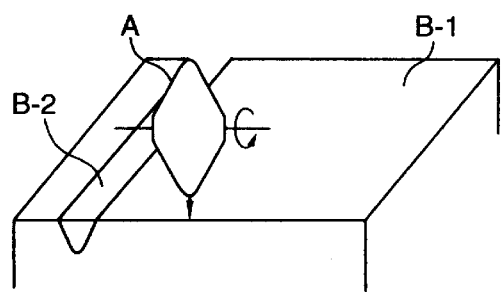
Figure 7D:
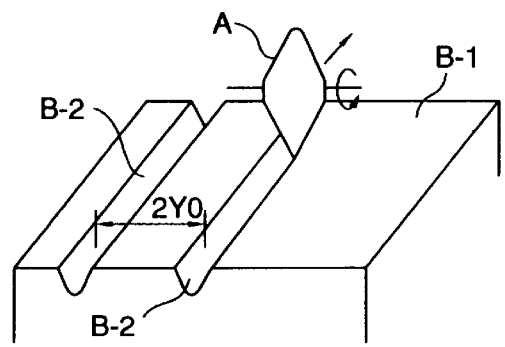
Figure 7E:
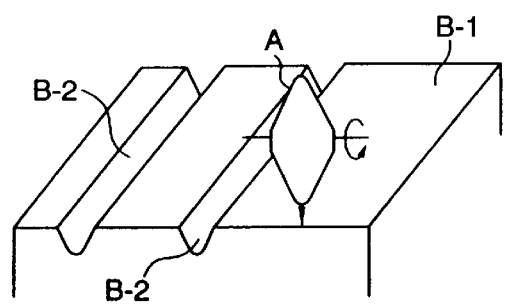
Figure 8A:
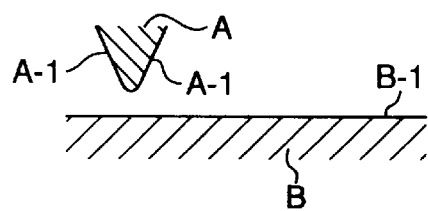
FIGS. 8A, 8B, 8C, 8D and 8E are a set of cross-sectional views corresponding to the processes depicted by the diagonal views in FIGS. 7A through 7E.
Figure 8B:
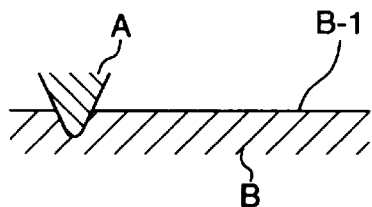
Figure 8C:
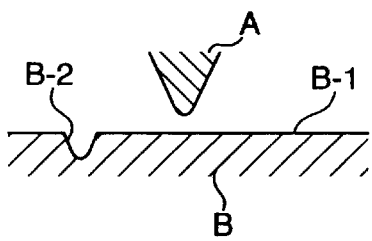
Figure 8D:
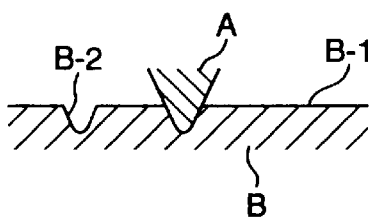
Figure 8E:
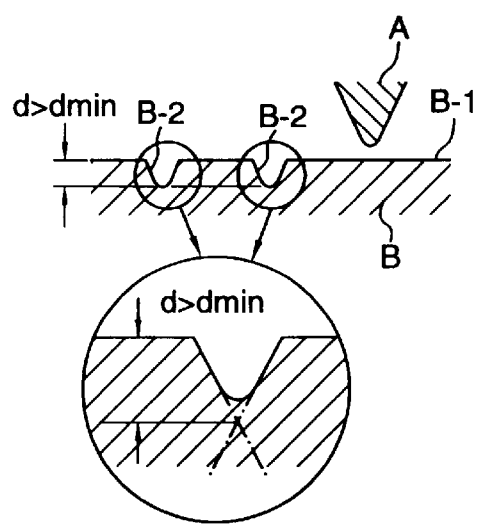

The concavities B-2 are formed so that each extends in the longitudinal dimension, as depicted in FIGS. 7B and 7C, and these are formed in a direction that is perpendicular to the longitudinal direction, with a pitch interval 2YO, in a number that is the number of optical fiber engagement portions to be formed plus 1, and such that the depth between the concavities B-2 is constant (FIGS. 7D and 7E). The point of forming these in a number that is the number of optical fiber engagement portions plus 1 will be explained subsequently with reference to FIGS. 11A through 11C.

When θ>θc  (2)

When angle θ exceeds θc, as diagrammed in FIG. 4C, the shape of the tip of the grindstone A may be pointed, or described by a circular arc, or flat, orsome other shape. That is because then the crown exposure will be guaranteed irrespective of the tip shape. The method of using a grindstone A shaped in this manner to form concavities B-2 in a mold material B-1 is the. same as the method described above. However, the intersection A-4 between the tangent lines A-2 that are the two tangent lines of the main grinding surfaces A-1 in a cross-section perpendicular to the two main grinding surfaces A-1 of the grindstone A, as diagrammed in FIG. 1, is also supposed for the range wherein θ>θc, and the depth of the concavities B-2 in the mold B is made to be at a deeper position than the intersection A-4.

Irrespective of the angle θ, the cross-sectional shape of the concavities B-2 will reflect the cross-sectional shape of the grindstone A used for grinding. More specifically, the angle that is subtended by the tangent line of the mold contour at a point B-4 which forms a place C-2 that supports the optical fiber F diagrammed in FIG. 3C, and, similarly, by the tangent line of the mold contour at the neighboring point B-4, equals θ.

The depth of the concavities B-2, moreover, is made such that the intersection A-4 is deeper than dmin, and shallower than dmax, defined below.

$$dmax=YO/\tan(\theta/2) \quad (5)$$

Figure 12A:
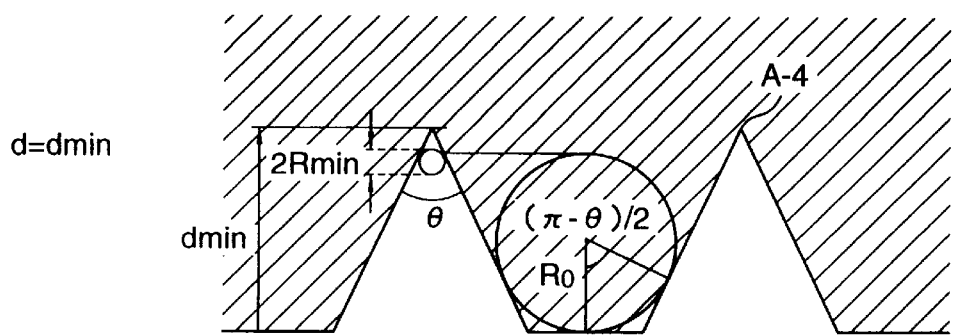
FIGS. 12A through 12C are a set of cross-sectional views of molds according to the embodiment when the depth of the intersection A-4 is changed, FIG. 12A being when d=dmin, FIG. 12B when dmin<d<dmax, and FIG. 12C when d=dmax.
Figure 12B:
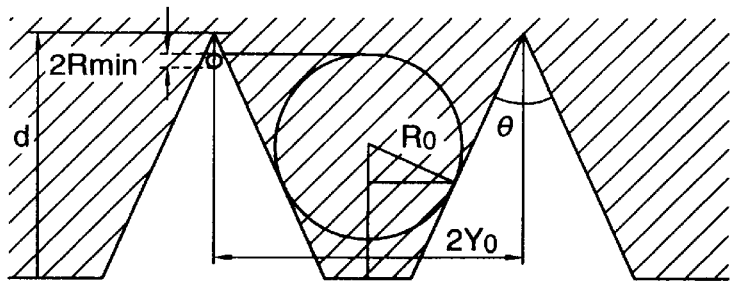
Figure 12C:
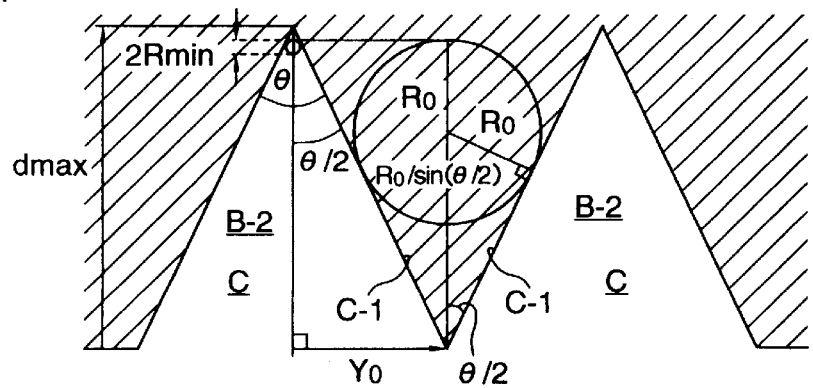

This formula (5) is easily derived from FIG. 12C which diagrams the case where d=dmax, which is the condition necessary for the flat bottom to disappear from the engagement portions C-1 of the optical fiber guide block C.

By making it so that the intersection A-4 is at a position that is shallower than dmax, some of the surface B-1 will remain between the concavities B-2 because the surface B-1 (surface wherein the concavities are ground) of the mold material depicted in FIGS. 7A through 7E is flat.

When optical fiber engagement portions C-1 are formed in an optical fiber guide block C using such a mold B as this, what is obtained is an optical fiber guide block C wherein the bottoms of the optical fiber engagement portions C-1 are comprised of flat surfaces (FIGS. 3B and 3C).

The grindstones A of the present invention are mainly used as grindstones which are turned, as represented in FIGS. 7A through 7E. In order to machine the desired mold using the grindstone in this manner, it is necessary:

(1) that the grindstone have a turning shaft; and
(2) that either the main grinding surfaces form symetrical turning surfaces each of which are centered on a turning shaft, or that the shape thereof be such that imaginary symmetrical turning surfaces cali be circumscribed about the main grinding surfaces when the axis of symmetry is made to coincide with the turning axis of the grindstone.

Figure 9A:
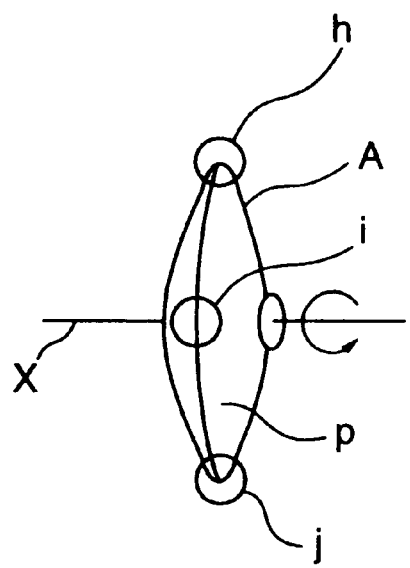
FIGS. 9A and 9B are general explanatory diagrams of grindstones according to the embodiment.

Diagramming this yields FIG. 9A. In this figure, at points h, i, and j, etc., about the periphery of the grindstone, in the grindstones A that are set forth in the first through the fifth invention, the main grinding surface p constitutes a symmetrical turning surface, relative to axis X, in the periphery of the grindstone. However, this does not mean that machining cannot be performed unless it is with a grindstone A having symmetrical turning surfaces, as in FIG. 9A. In some cases it will be possible to perform the machining even if, as in FIG. 9B, a concavity e is made in the periphery, or a groove g is made in the main grinding surface p, or a chip k develops. That being so, the grindstones A of the present invention include those having shapes as in FIG. 9B, so long as, taking the main grinding surface p in FIG. 9A as an imaginary symmetrical turning surface, the grindstone A is such that it can circumscribe such imaginary surface.

Figure 9B:
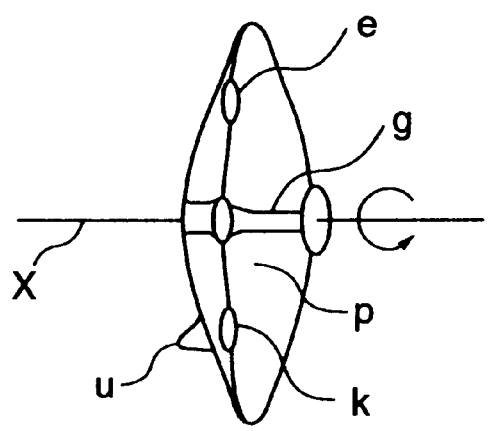

By the main grinding surface p, moreover, is meant a surface that, of the surfaces of the grindstone A, is primarily used in grinding. There is no problem with having a projection u in a portion not used in grinding, as depicted in FIG. 9B. In such case, the portion with the projection u is rendered so that it is not contained in the main grinding surface p.

Embodiments of the present invention will now be described.

$$Rmin \leq R \leq Rmax \qquad (1)$$

Grinding machining is performed, while turning a grindstone A, perpendicularly to the surface B-1 of a mold material B, as diagrammed in FIGS. 7A through 7E, so that, taking the surface of the mold material as the reference, the depth is made so that the intersection A-4 diagrammed in FIG. 1 is at a position which is deeper than dmin, as previously defined. After forming a concavity B-2 extending in the longitudinal dimension while moving the grindstone A as depicted in the drawing, the relative positions of the grindstone A and the mold material B are shifted in a direction perpendicular to the longitudinal direction by a pitch of 2YO, and grinding is again done with the grindstone A, so that the depth becomes the same as was formed previously, and so that the concavity B-2 foried previously is paralleled. This process is done repeatedly to grind-machine concavities B-2 in a number equal to the number of optical fiber engagement portions which are to be fabricated by press-molding process plus 1.

It is preferable that the mold material B here have the anti-oxidation properties required for use in press-molding glass, that it be non-reactive with glass, and that it exhibit neither morphological nor plastic change in a high-temperature environment. Silicon carbide, tungsten carbide, alumina, zirconia, crystalline glass, silicon, and cermets of titanium carbide and titanium nitride, etc., may be listed as specific materials. As to the grindstone A for grinding these mold materials B, it may be a resin-bonded diamond-grindstone or a metal-bonded diamond grindstone or the like. The grinding process noted above may be performed with a dicing machine or other grinding-machining apparatus used for precision machining.

To add some points here to what has already been said about the shape of the grindstone A, circular arc shapes, flat shapes, and parabolic shapes may be mentioned specifically as shapes for the cross-section of the tip thereof. If the shape is that of a circular arc, or flat, then not only will the grindstone fabrication be comparatively easy, but there will be little degradation in the shape of the tip due to wear, as compared to grindstones having a pointed tip, and the grinding-machining of the whole shape can be done stably.

When the angle θ is equal to or smaller than θc, then, as diagrammed in FIGS. 4A through 4C, if the cross-sectional shape of the grindstone tip is not contained within the area described earlier, press-moldirig process cannot be performed wherewith optical fiber F crown exposure is possible. When, on the other hand, the angle θ is larger than θc, then optical fiber F crown exposure becomes independent of the cross-sectional shape of the tip of the grindstone A that is used. In other words, even if a grindstone having a sharp tip is used, a mold B can be obtained for forming an optical fiber guide block C wherewith crown exposure of the optical fiber F is possible.

The depth to which the concavities B-2 are ground, that is, the depth of the concavities B-2 of the mold B, must be such that the intersection diagrammed in FIG. 1 is at a position which is deeper than dmin defined earlier. When the position of that intersection A-4 is at dmin or shallower than dmin, then, when an optical fiber F is engaged in an optical fiber engagement portion C-1, the optical fiber F will come in contact with the bottom of the optical fiber engagement portion C-1, the optical fiber F will be pushed up from the two support points of the optical fiber engagement portion C-1, and it will cease to be possible to restrain the position of the optical fiber F in the direction in which the optical fibers F are aligned. When the optical fibers F are engaged and aligned in the optical fiber engagement portions C-1 by a mold B that satisfies the conditions noted above, the crown exposure of each optical fiber F is possible, and an optical fiber guide block C is obtained wherein the optical fibers F are stably engaged in the optical fiber engagement portions C-1.

The optical fibers F are engaged and aligned in these optical fiber engagement portions C-1, the side surfaces of the crown-exposed optical fibers are pressed down under the pressing surface of a pressure block, and bonded and secured. In this condition, an optical fiber array is obtained wherein the optical fiber sides are supported at three points, namely at two points by the optical fiber engagement portions, and at one point by the pressing surface of the pressure block, looking at a cross-section perpendicular to the optical axes of the optical fibers. The light input/output end surfaces of this optical fiber array are optically polished and made ready for actual use.

When the cross-section of the grindstone tip is shaped as a circular arc, if the radius of curvature R of the circular arc increases, and the apex of the grindstone tip moves outside of the straight line A-2-c, outside of the region bounded by the tangent lines A-2, the straight line A-7-1, and the straight line A-2-c, as diagrammed in FIG. 1, then the points C-2

(which are points on the optical fiber guide block C that correspond to points A-2-*a* and A-2-*b* in FIG. 1) at which are supported the optical fiber sides F-1 in the optical fiber guide block C in FIG. 3A through 3C cease to be positioned on the main grinding surfaces A-1. In other words, the angles subtended by the tangent lines on the cross-sectional contour of the optical fiber engagement portions C-1 at point C-2, and by the tangent lines on the contour of the forming surfaces B-0 in the mold B that forms the points C-2, cease to be the angle θ subtended by the two tangent lines A-2 that touch the main grinding surfaces of the grindstone.

Now, to explain further about the grinding depth of the concavities B-2, it is desirable that the grinding depth, that is, the depth of the concavities B-2, be such that the intersection A-4 in FIG. 1 be at a position that is shallower than dmax, defined earlier. The reason is that, because the surface of the mold material B in, which the concavities are ground is flat, when the grinding depth is made as noted above, some of the flat surface B-1 of the mold material B remains as a forming surface sandwiched between the concavities B-2. In such a mold B as this, the spaces between the concavities B-2 are flat and have no edges which are sharp or thin, wherefore there is no danger of the tips of the concavities B-2 in the mold B being chipped, thus making the mold B easy to handle. If, on the other hand, the depth of the concavities is made deeper than dmax, defined earlier, then sharp and thin edges are produced between the concavities which readily chip and easily lead to problems. When press-molding an optical fiber guide block C, such a mold B as this forms flat surfaces at the bottom of the optical fiber engagement portions C-1. In glass press-molding process that forms flat bottoms like this, after the optical fiber engagement portions C-1 are formed, the stresses that are produced in the tips between the concavities of the mold and in the bottoms of the optical fiber engagement portions C-1 are dispersed in a cooling process, which functions to reduce chipping and cracking in the tips between the concavities in the die.

Figure 11A:
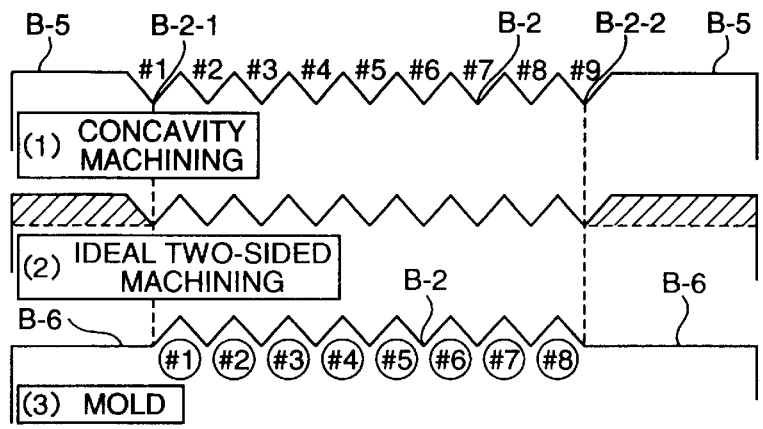
FIGS. 11A through 11C are explanatory diagrams of two-sided machining according to the embodiment, FIG. 11A depicting ideal two-sided machining, FIG. 11B depicting machining wherewith positioning is impossible, and FIG. 11C depicting two-sided machining in a case where the bottoms of the concavities in the mold are flat.

After subjecting the mold material B to the concavity grinding process, the portions B-5 that are outside of the concavities B-2-1 and B-2-2 that are positioned outermost among the plurality of concavities B-2, in FIG. 11A, and that are connected at least with the bottoms of the outermost concavities B-2-1 and B-2-2, are machined so that they are brought into the same plane B-6 as the bottoms of the concavities B-2-1 and B-2-2 ((1) concavity machining→(2) ideal machining→(3) mold).

This process is hereinafter called two-sided machining. By this two-sided machining, a mold is obtained having a shape such that the portions on both sides of the mold and the bottom of the concavities B-2 are positioned in the same plane B-6.

In an optical fiber array comprising an optical fiber guide block C that is press-formed by such a mold B as this, a pressure block, and optical fibers, the gap between the bonding surfaces of the optical fiber guide block C and pressure block can be made uniform at every place.

Figure 11B:
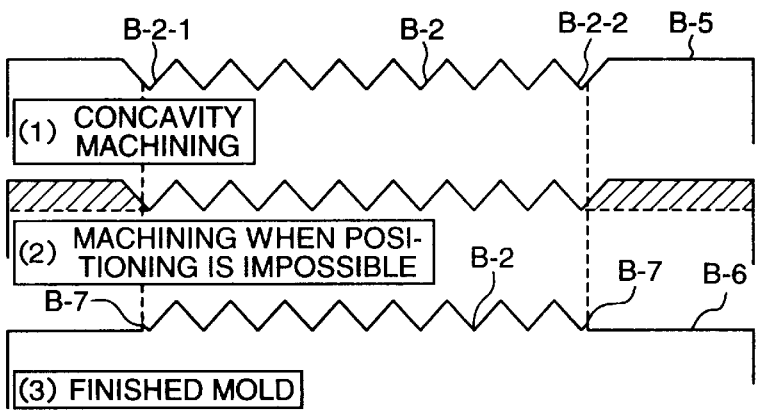
Figure 11C:
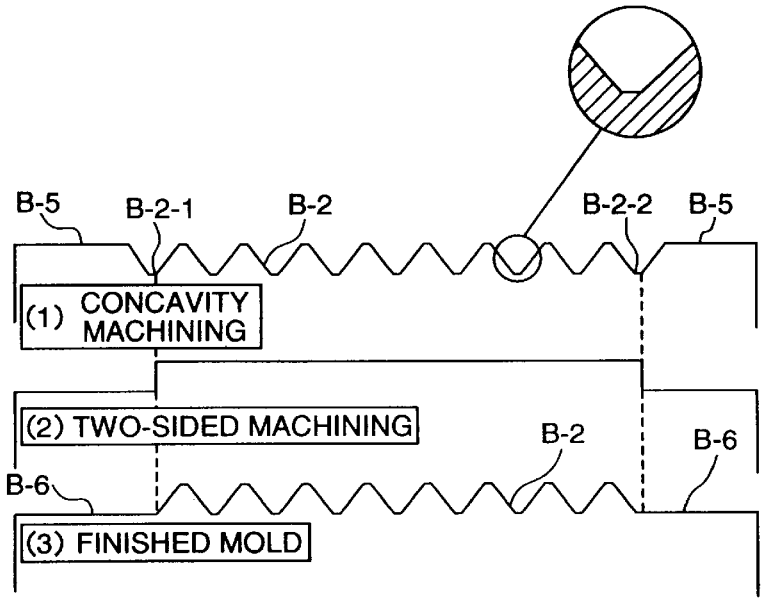

However, in cases where the bottoms of the concavities in the mold B are not flat (when the grindstone tip shape is made sharp), when performing the two-sided machining, if the positions of the centers of the outermost concavity bottoms B-2-1 and B-2-2 and the ends of the portions removed by the two-sided machining are not accurately positioned, an unwanted non-machined portion having the shape of a projection B-7, as diagrammed in FIG. 11B, will be made. When, however, the bottom of the concavities in the mold B are made flat (when the grindstone tip shape is made flat), then, as diagrammed in FIG. 11C, the positioning precision tolerance can be made as large as the width of the flat bottom of the concavity B-2, so there will be no remaining unmachined portion having the shape of the projection B-7 due to a positioning error. The two-sided machining can be performed accurately by using a dicing machine or other precision machining apparatus in doing the grinding.

After shape-machining the mold as described in the foregoing, a mold release thin film(s) is formed, at least on the forming surfaces B-0 of the mold, to facilitate post-formation die separation of the object being press-formed. The mold release thin film(s) may be carbon-based or platinum alloy-based, etc.

Molds such as this are used to press-form the material being formed, at a press-formable temperature. Using such molds as this, for example, a down die is formed integrally by taking such a mold and another mold for forming the pedestal of an optical fiber guide block for holding an optical fiber sheath and securing these in a frame, using trunk dies and an up die, placing the material to be formed in the space bounded by the down die, trunk dies, and up die, and conducting press-molding at a press-formable temperature. Optical fiber engagement portions are thus formed in the glass that is formed, and an optical fiber guide block is obtained.

The molds of the present invention are not limited to examples in which an optical fiber guide block such as noted above is used. Optical component mounting boards and optical component securing hardware, etc., used in precisely positioning light-emitting devices or light-sensing devices, in addition to optical fibers, can be employed in forming the optical fiber engagement portions.

Any glass that is press-formable can be used as the glass to be formed. However, glass having a low coefficient of thermal expansion, a yield point below 600°, and outstanding UV transmissivity is desired. Glasses containing $SiO_2$, $B_2O_3$, and $ZnO$, for example, may be recommended. Any other commercially sold press glass may be used.

The values for YO and RO arrived at by making compensations based on the mean coefficient of thermal expansion between the glass transition temperature and the room temperature of the mold material and the glass that are press-formed during mold fabrication.

$$\text{Rmin*} \leq R \leq \text{Rmax} \qquad (2)$$

Now, in describing the embodiment set forth in the foregoing, it is presupposed that, unless the three-point support condition is satisfied, the sides of the optical fiber ends will develop clearance (gaps) between the optical fiber engagement portions or with the pressing surface of the pressure block, making it very difficult to effect holding and securing with high location accuracy. In actuality, however, it has been found that, even in a condition wherein the optical fibers are embedded inside the optical fiber engagement portions so that crown exposure can no longer be effected, if the range of the radius of curvature R of the grindstone A is expanded as noted below, light connection losses can be kept within allowable limits when an optical fiber array is used in a condition wherein crown exposure can no longer be effected.

$$\text{When } \theta \leq \theta c \qquad (a)$$

$$\text{Rmin*} = \text{Rmin} - (\phi/5) \qquad (6)$$

In the range where Rmin<R≦Rmax, when optical fibers are engaged and positioned in optical fiber engagement portions in a crown-exposed condition, and the optical fibers are pressed down with a pressure block, the optical axes of the optical fibers are aligned on a straight line in a cross-section perpendicular to the optical axes.

Figure 13:
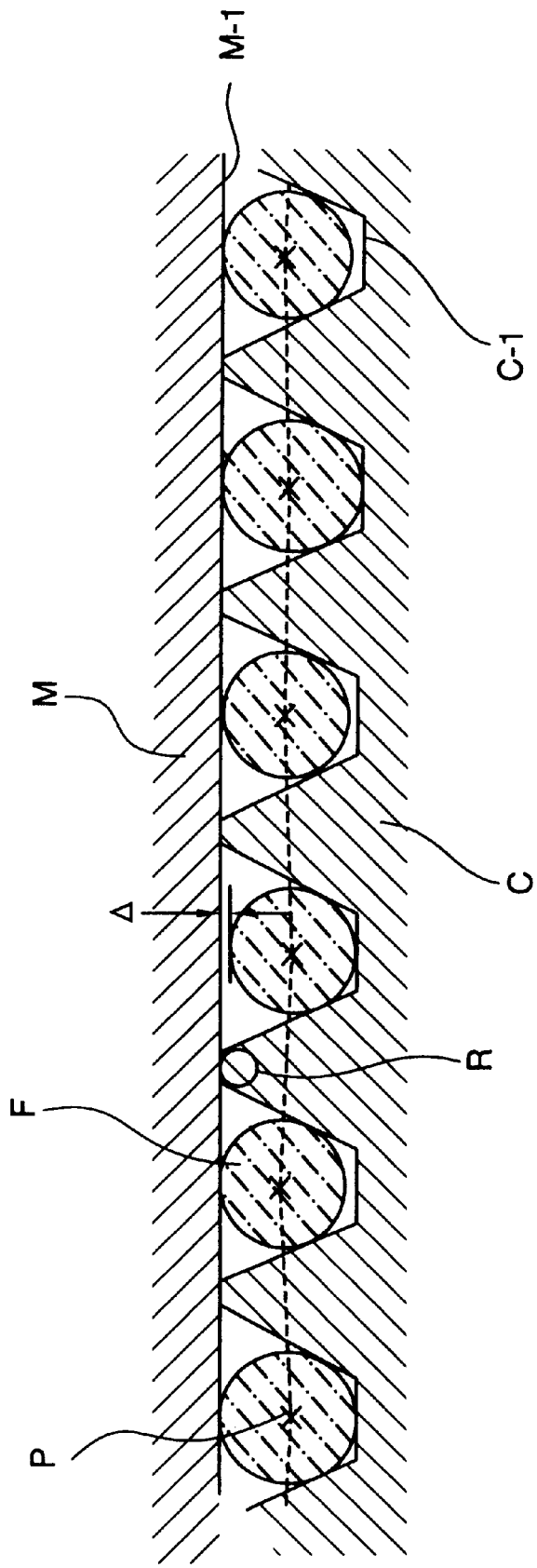
FIG. 13 is a cross-sectional view of the vicinity of, optical fiber engagement portions according to another embodiment, wherein the expanded range Rmin*≦R≦Rmin applies.

In the expanded range $Rmin^* \leq R \leq Rmin$, the amount of optical fiber crown exposure $\Delta$ will be $\Delta \leq 0$. In this condition, when the optical fiber engagement portions C-1 are covered with a pressure block M, as diagrammed in FIG. 13, each of the plurality of optical fibers F will be secured in one of the positions where it is restrained within a range bounded by the pressing surface M-1 of the pressure block M and the optical fiber engagement portion C-1. Because the crown-exposure amount $\Delta$ is $\Delta \leq 0$, however, the optical axes P of the optical fibers F will not be aligned in a straight line in a cross-section perpendicular to the optical axes P. By making $R \geq Rmin^*$, however, even if $\Delta \leq 0$, the amounts by which the optical axes P of the optical fibers F are shifted away from the straight line will become smaller. This amount of shift is relative to the depth dimension of the optical fiber engagement portions C-1, but the amount of shift in the positions of the optical axes P of the optical fibers F relative to the direction of optical fiber alignment will also become smaller.

When $R < Rmin^*$, the amount of shift in the optical axes P of the optical fibers F will become larger, as will the optical connection loss when this optical fiber array is used. Moreover, when single mode fiber (having a core diameter $\phi=10$ µm and an outer diameter $2RO=125$ µm) is used for these optical fibers, it is possible to keep the optical connection loss between optical fiber arrays, or between an optical fiber array and another component (such as when light waveguides having a core diameter of $\phi$ are configured in an array) within 0.2 dB (a specification deemed necessary in the fields of optical communications and measurement, etc.) by making $Rmin^{} \leq R \leq Rmax$ (where $Rmin^{} = Rmin - (\phi/10)$).

When $\theta > \theta c$

If $\theta$ is within this range, then optical fiber crown exposure is possible irrespective of the cross-sectional shape of the grindstone tip-(i.e. the cross-sectional shape of the bottom of the concavities in the mold), and there is no need to consider a minimum value for R in order to make crown exposure possible. Accordingly, nothing is changed from before the expansion.

The mold fabrication method described thus far, wherein a mold material is machined by grinding with a grindstone having a cross-sectional shape perpendicular to two main grinding surfaces that approximates the cross-sectional shape perpendicular to the optical axes of the optical fibers when those optical fibers are engaged and arrayed in optical fiber engagement portions in an optical fiber guide block, forming concavities in prescribed positions and in a prescribed direction, affords advantages in that high-precision molds having shapes faithful to their design can be fabricated with good reproducibility and good productivity.

The present invention is not limited to the fabrication of optical fiber guide blocks in which optical fiber engagement portions are arrayed at a constant pitch. The invention may also be applied to an optical fiber guide block having but one optical fiber engagement portion. For example, two concavities such as are diagrammed in FIG. 8E may be formed at an interval of 2YO, and, if two-sided machining is performed, as diagrammed in FIGS. 11A through 11C, a mold can be obtained for fabricating an optical fiber guide block having but one optical fiber engagement portion. Depending on the case, if a mold release thin film(s) is formed on the forming surfaces, and a material to be forming such as glass is press-formed, an optical fiber guide block having but one optical fiber engagement portion can be obtained. As is diagrammed in FIG. 8E, moreover, a plurality of concavities B-2 may be formed at a pitch 2YO and made into a concavity group 1, and then a plurality of concavities B-2 formed at a different pitch 2YO' to make a concavity group 2, making forming surfaces that form optical fiber engagement portions between the concavity groups. In such case also, as expedient, if a mold release thin film(s) is formed on the forming surfaces, and glass or other material for forming is press-machined, it is possible to obtain an optical fiber guide block comprising a portion wherein optical fibers are arrayed at a pitch interval of 2YO, and a portion wherein they are arrayed at 2YO'.

Embodiment 1

Figure 14A:
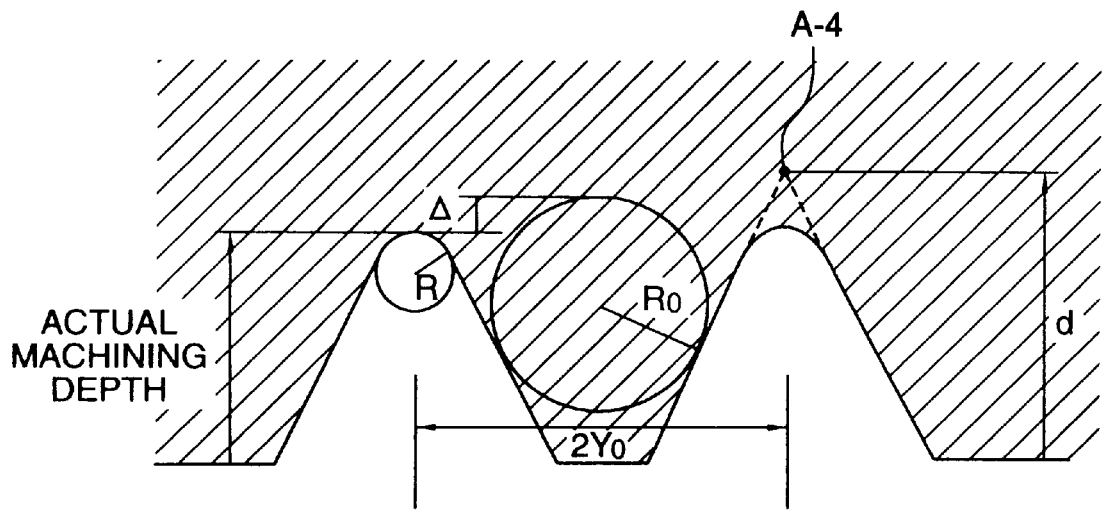
FIGS. 14A and 14B are a pair of cross-sectional views of molds corresponding to Embodiment 1, with FIG. 14A diagramming the case where R>Rmin, and FIG. 14B the case where R=Rmax.
Figure 14B:
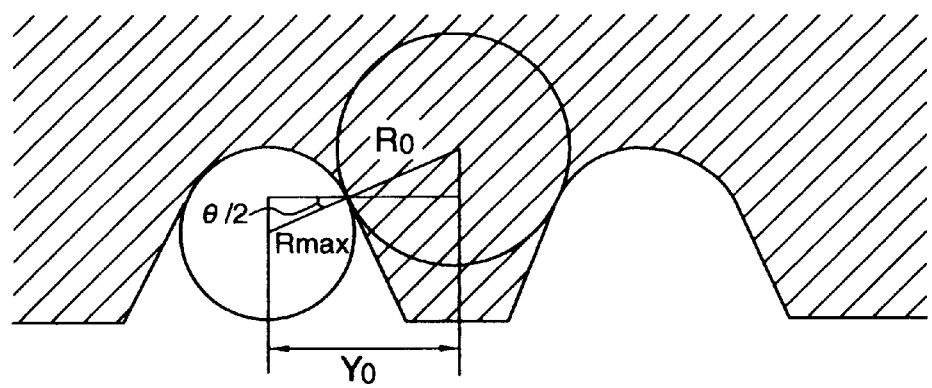

A mold was fabricated for press-molding a glass preform, fabricating an optical fiber guide block wherein are positioned and secured the optical input/output ends of single mode quartz glass fiber such as is widely used in the fields of optical communications and optical measurement. The number of cores in the optical fibers engaged in the optical fiber engagement portions in the optical fiber guide block is 8, with a pitch 2YO of 250 µm. The optical fiber radius is 62.5 µm. The parameters pertaining to the grindstone used in machining the concavities in the mold for forming the optical fiber engagement portions in the optical fiber guide block, and to the shape of the concavities, are listed in Table 1. Cross-sections of a mold corresponding to Table 1 are diagrammed in FIGS. 14A and 14B.

TABLE 1

| Angle $\theta$ (deg) | Rmin (µm) | Rmax (µm) | dmin (µm) | dmax (µm) | R (µm) | d (µ) | Crown expos $\Delta$ (µm) | Range for $\Delta$ (µm) |
|---|---|---|---|---|---|---|---|---|
| 40 | 51.04 | 70.52 | 223.1 | 343.4 | 61.0 | 300 | 10 | <37.47 |
| 50 | 42.22 | 75.42 | 182.6 | 268.0 | 52.2 | 240 | 10 | <45.36 |
| 60 | 29.0 | 81.84 | 154.0 | 216.5 | 39.0 | 190 | 10 | <52.83 |
| 70 | 9.49 | 90.1 | 132.0 | 178.5 | 19.5 | 150 | 10 | <59.9 |
| 74 | — | 94.02 | 124.5 | 165.8 | 19.5 | 140 | 13.3 | <62.68 |
| 80 | — | 100.68 | 114.2 | 148.9 | 19.5 | 130 | 21.5 | <66.71 |
| 90 | — | 114.28 | 99.1 | 125.0 | 19.5 | 110 | 33.9 | <73.22 |

Notes:
If the crown-exposure amount $\Delta$ is first determined for angle $\theta$ assuming constant pitch 2YO, R may be determined by the following equation for the range $Rmin < R < Rmax$.
$\Delta = R[\{1/\sin(\theta/2)\} - 1] - [\{YO/\tan(\theta/2)\} - \{RO/\sin(\theta/2)\} - RO]$ d is the depth of the intersection A-4. The actual grinding depth (depth of grindstone tip apex referenced against mold material surface) will be the value obtained by subtracting the value of $R[\{1/\sin(\theta/2)\} - 1]$ from d.
The "—" symbol in the Rmin column indicates that a positive value is obtained for crown exposure if $R < Rmax$.

In this embodiment, the cross-section of the concavities (grindstone cross-section) is V-shaped and the cross-section of the bottoms (grindstone tip cross-section) is shaped as a circular arc. The mold material used was tungsten carbide. The grindstone used in grinding the concavities was made of diamond grit. In Table 1, R is the radius of curvature of the circular arc and d is the depth of the concavities. The surface of the mold material machined was a flat surface. A dicing of the machine was used in grinding the concavities. In the surface of the mold material, 9 concavities, that being the number of optical fiber cores 8 plus 1, were formed, extending in the prescribed direction at a pitch of 250 μm and parallel to one another. At this time, the positions of the concavities in the mold material were adjusted so that a position shifted by a half pitch YO, which is half the distance between the center of one concavity and the center of an adjacent concavity, forms the center of an optical fiber engagement portion. Flat forming surfaces were left remaining between the concavities in all of the molds, in a shape wherewith it is possible to form optical fiber guide blocks comprising optical fiber engagement portions having flat bottoms. When the pitch YO and the optical fiber radius RO have the values noted above, the boundary condition demanded for the shape of the grindstone tip is that angle θ be θc=74°. At angles exceeding 74°, molds can be obtained wherewith optical fiber crown exposure is possible irrespective of the cross-sectional shape of the grindstone tip.

After forming 9 concavities in this manner, a dicing machine was used to perform two-sided machining on the bottom of the outermost concavities and the ends of the portions removed by two-sided machining. After the two-sided machining, a mold release thin film(s) made of platinum was formed on the forming surfaces to yield a mold equipped with mold release thin film(s).

Embodiment 2

Figure 15A:
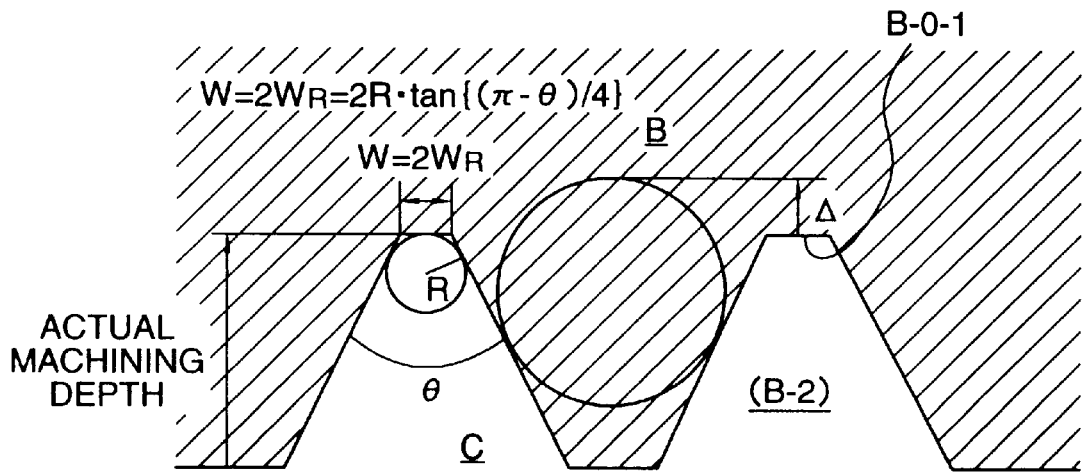
FIGS. 15A and 15B are a pair of cross-sectional views of molds corresponding to Embodiment 2, with FIG. 15A diagramming the case where W=2WR, and FIG. 15B the case where W is made maximum.
Figure 15B:
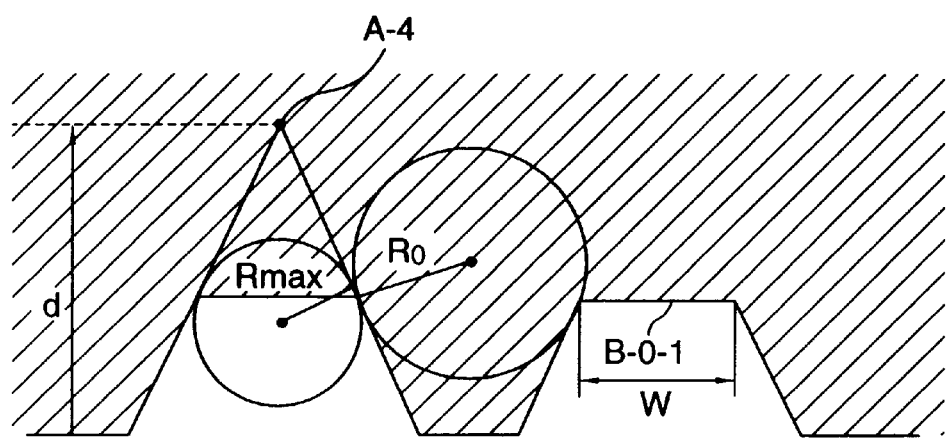

Next, mold machining was performed using a grindstone having a flat tip shape. In Table 2 are listed parameters pertaining to the grindstone and to the mold concavities. Mold cross-sections corresponding to Table 2 are presented in FIGS. 15A and 15B. In this figure, W is the width of the flat forming surface B-0-1 between the concavities B-2.

TABLE 2

| Angle θ (deg) | Rmin (μm) | dmin (μm) | dmax (μm) | Grindstone tip W (μm) | d (μm) | Crown exposure Δ (μm) | Range for Δ (μm) |
|---|---|---|---|---|---|---|---|
| 40 | 51.04 | 223.1 | 343.4 | 78.7 | 300 | 10 | 83.9 |
| 50 | 42.22 | 182.6 | 268.0 | 63.1 | 240 | 10 | 88.9 |
| 60 | 29.0 | 154.0 | 216.5 | 45.0 | 190 | 10 | 93.8 |
| 70 | 9.49 | 132.0 | 178.5 | 24.0 | 150 | 10 | 98.3 |
| 74 | — | 124.5 | 165.6 | 14.3 | 140 | 10 | 100.1 |
| 80 | — | 114.2 | 148.9 | 10 | 130 | 16.7 | 102.7 |
| 90 | — | 99.1 | 125.0 | 10 | 110 | 30.9 | 106.7 |

Notes:
The grindstone tip width W is determined using parameter R' that satisfies the following formula.
$$\Delta = R'[\{1/\sin(\theta/2)\} - 1] - [\{YO/\tan(\theta/2)\} - \{RO/\sin(\theta/2)\} - RO]$$
$$W = 2R' \tan\{(\pi - \theta)/4\}$$

When the pitch YO and the optical fiber radius RO have the values noted above, the boundary condition demanded for the shape of the grindstone tip is that angle θ be θc=74°. At angles exceeding 74°, molds can be obtained wherewith optical fiber crown exposure is possible irrespective of the cross-sectional shape of the grindstone tip. This is the same as in Embodiment 1. Using such grindstone, concavity-grinding machining and two-sided machining were performed as in Embodiment 1. However, because the bottoms of the mold concavities are flat, the precision of positioning the ends of the portions removed by two-sided machining and the bottoms of the outermost concavities was kept within the width of the flat bottoms. In this manner, shape machining was performed so as not to make a mold having any unnecessary projections. The mold material was tungsten carbide. The grindstone used was made of the same substance as in Embodiment 1. After the shape machining, a mold release thin film(s) made of platinum was formed on the forming surfaces of the mold to yield a mold equipped with mold release thin film(s).

Embodiment 3

Figure 16:
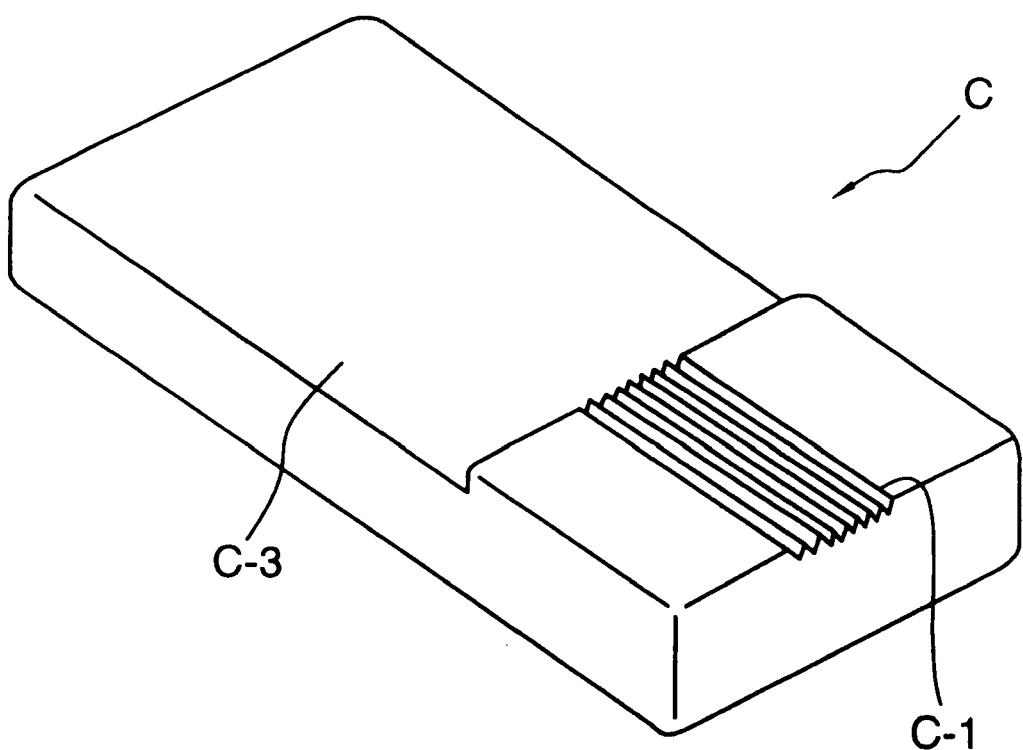
FIG. 16 is a diagonal view of an optical fiber guide block according to Embodiment 3.
Figure 17A:
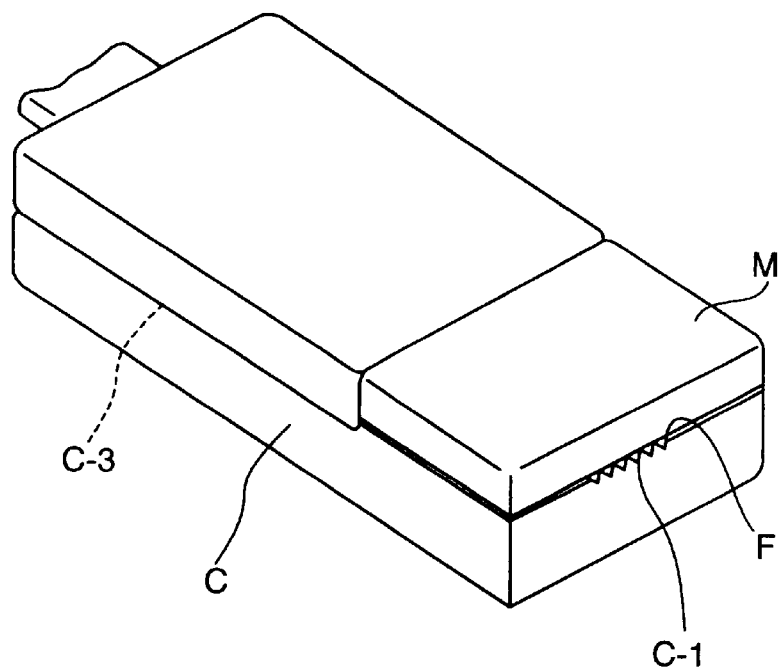
FIGS. 17A and 17B are a set of explanatory diagrams for an optical fiber array according to Embodiment 3, FIG. 17A being a diagonal view, and FIG. 17B being a front elevation.
Figure 17B:
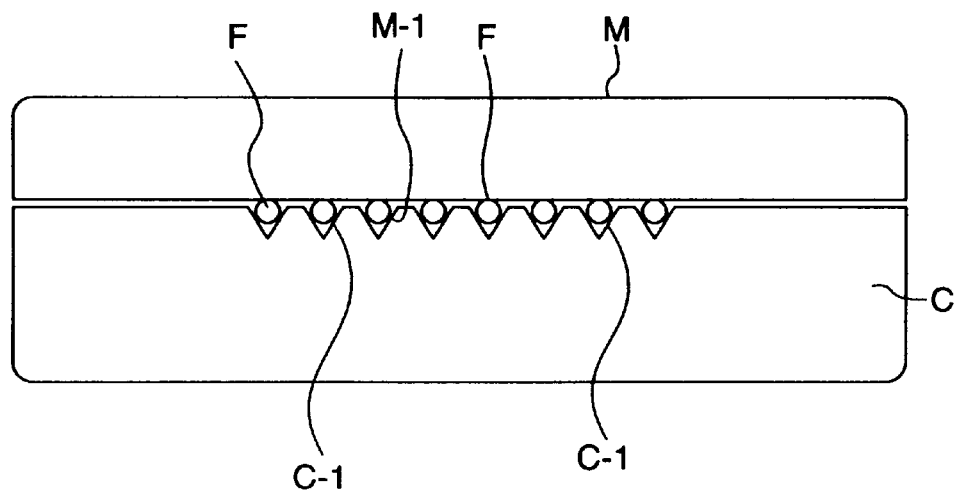
Figure 18B:
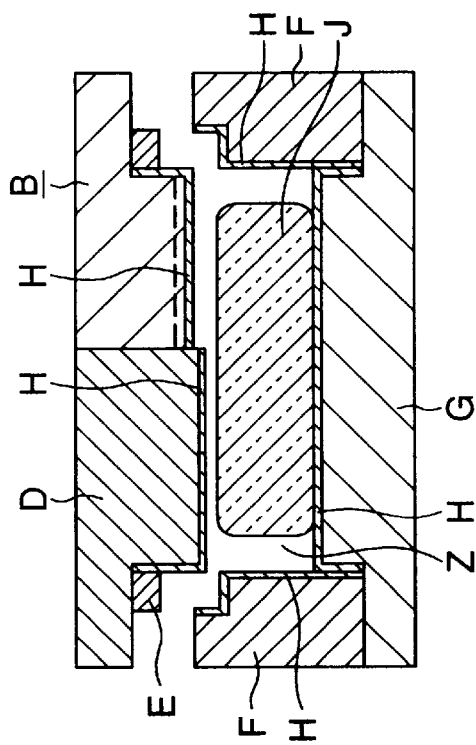
FIGS. 18A through 18D are a set of process drawings which describe a method of fabricating an optical fiber guide block with a mold for press-molding according to Embodiment 3, FIG. 18A being a front cross-sectional view of the front of the press, FIG. 18B a side cross-sectional view thereof, FIG. 18C a front cross-sectional view of the middle of the press, and FIG. 18D a side cross-sectional view thereof.
Figure 18D:
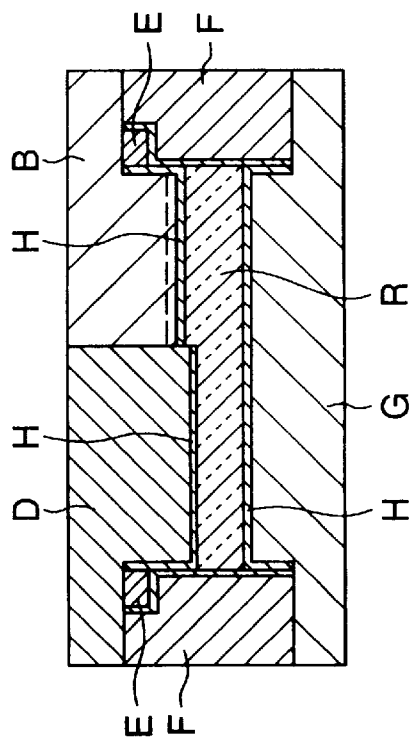
Figure 18A:
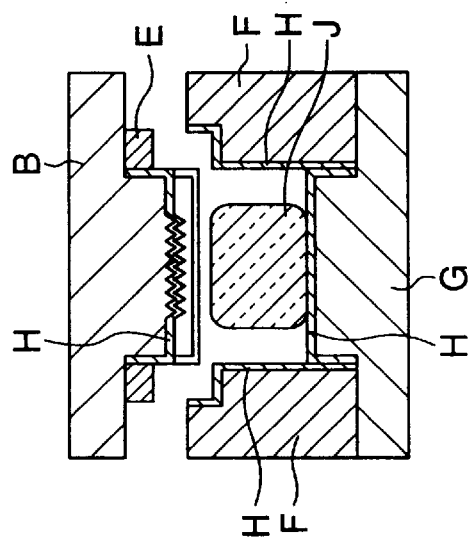
Figure 18C:
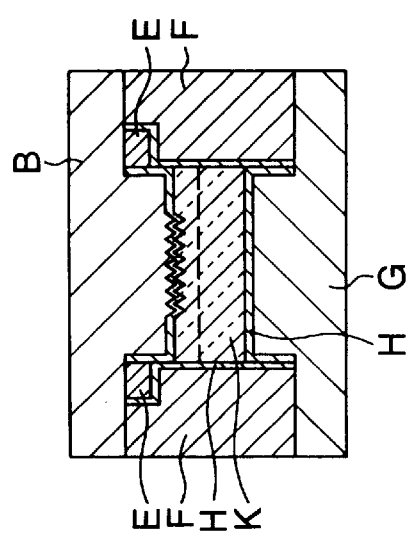

Using the molds disclosed in Embodiments 1 and 2, an optical fiber guide block C was formed, as depicted in FIG. 16, and an 8-core optical fiber array was fabricated, as depicted in FIGS. 17A and 17B, using the optical fiber guide block C and a pressure block M. In this embodiment, as diagrammed in FIGS. 18A through 18D, a mold D that forms a pedestal C-3 that carries an optical fiber sheath in the optical fiber guide block C depicted in FIG. 16, and a mold B of the present invention, equipped with a mold release thin film(s) H. are integrated in a securing frame E to form a down die, while, separately, a cavity Z was configured, using trunk dies F to form the optical fiber guide block sides, and an up die G to form the bottom of the optical fiber guide block.

Glass preforms J having the compositions noted in Table 3 were placed inside the cavity Z, and, at the forming temperatures noted in Table 3, the glass preforms J were put under pressure by the up and down dies.

TABLE 3

| Glass Composition[*1] | | | | | | | |
|---|---|---|---|---|---|---|---|
| SiO$_2$ | 4.0 | 4.0 | 23.3 | 4.0 | 4.0 | 4.8 | 13.3 |
| GeO$_2$ | — | 5.0 | — | — | — | — | — |
| B$_2$O$_3$ | 27.2 | 32.2 | 22.2 | 32.2 | 37.2 | 32.2 | 32.2 |
| ZnO | 54.5 | 40.5 | 42.5 | 40.5 | 40.2 | 40.7 | 44.0 |
| MgO | — | — | — | — | — | — | 1.0 |
| CaO | — | — | — | — | — | — | 1.5 |
| SrO | — | — | — | — | — | — | — |
| BaO | — | — | — | — | — | — | — |
| PbO | — | — | — | — | — | — | — |
| (A)[*2] | 54.5 | 40.5 | 42.5 | 40.5 | 40.2 | 40.7 | 46.5 |
| Al$_2$O$_3$ | 2.5 | 1.0 | 7.5 | 1.0 | 2.5 | 9.0 | 5.5 |
| (B)[*3] | 88.2 | 82.7 | 95.5 | 77.7 | 82.4 | 86.7 | 97.5 |

TABLE 3-continued

|  |  |  |  |  |  |  |  |  |
|---|---|---|---|---|---|---|---|---|
|  | Li$_2$O | 2.5 | 2.5 | 4.5 | 2.5 | — | 2.5 | 2.5 |
|  | La$_2$O | 9.3 | 13.3 | — | 13.3 | 15.3 | 4.3 | — |
|  | Y$_2$O$_3$ | — | — | — | 5.0 | — | — | — |
|  | TiO$_2$ | — | — | — | — | 0.4 | — | — |
|  | ZrO$_2$ | — | 1.5 | — | 1.5 | 1.5 | 1.5 | — |
|  | Nb$_2$O$_5$ | — | — | — | — | 0.4 | — | — |
|  | Ta$_2$O$_5$ | — | — | — | — | — | 5.0 | — |
|  | Sb$_2$O$_3$*[4] | — | — | 0.5 | — | — | — | — |
| Parameter | Transition point | 465° C. | 500° C. | 470° C. | 500° C. | 530° C. | 510° C. | 495° C. |
|  | Yield point | 495° C. | 540° C. | 500° C. | 530° C. | 555° C. | 540° C. | 520° C. |
|  | Mean CTE*[5] | 64 | 63 | 62 | 66 | 67 | 64 | 66 |
|  | UV Perm.*[6] | 81% | 85% | 91% | 84% | 80% | 81% | 83% |
| Forming temp |  | 545° C. | 593° C. | 553° C. | 584° C. | 595° C. | 592° C. | 573° C. |

*[1]Values for each component are in values of wt %.
*[2]Represents Zno, MgO, CaO, SrO, BaO, and PbO total content.
*[3]Represents SiO$_2$, GeO$_2$, B$_2$O$_3$, RO (R = Zn, Mg, Ca, Sr, Ba, Pb), and Al$_2$O$_3$ total content.
*[4]Represents amount added outside composition proportions.
*[5]Represents mean coefficient of thermal expansion from room temperature to 400° C., in ×10$^{-7}$/° C. units.
*[6]Represents transmissivity of UV radiation of 350 nm wavelength through a test piece 2 mm in thickness.

After sufficient glass packing, the molding K was removed from the die to yield an optical fiber guide block C. Into the optical fiber engagement portions C-1 of the optical fiber guide block C fabricated as noted above, 8 quartz-glass single mode fibers were engaged and secured, as diagrammed in FIGS. 17A and 17B. Then, with the optical fiber sheath mounted on the pedestal C-3, a UV-hardening adhesive was applied, and the optical fiber sides were pressed down with a glass pressure block M having a flat pressing surface M-1. The adhesive was then irradiated with UV rays through the glass, thereby hardening the adhesive and setting the optical fibers. The light input/output end surfaces of the optical fiber array fabricated in this manner were optically polished to complete the optical fiber array.

After this polishing, the vicinity of the secured optical fibers so secured was examined under an electron microscope, from the end surfaces. This confirmed that all eight of the optical fibers were supported at three points. The optical fiber array was then subjected to a thermal cycle in which it was found that the total optical-connection loss fluctuation amplitude was within 0.3 dB. No changes in the location accuracy of the optical fibers were observed after these tests, nor were seen any changes in the condition wherein the optical fibers were held and secured by three-point support. When materials other than tungsten carbide, as noted above, were used as the mold material, the same good results were obtained. Thus, by employing the present invention, optical fiber crown exposure can be effected, making it possible to secure the ends of optical fibers by three-point support, and thereby enabling optical fibers to be stably held and secured with high location accuracy.

If the radius of the imaginary circle that forms the minimum radius of curvature of concavities shaped as circular arcs in a mold is within the expanded range, as provided, it is possible to effect stable holding and securing at high location accuracy, even without employing three-point support, and to keep the optical-connection loss in an optical fiber array within allowable limits.

What is claimed is:

1. A mold for fabricating optical fiber guide blocks, for the purpose of molding, by press-molding process, at least the optical fiber engagement portions of optical fiber guide blocks comprising optical fiber engagement portions for the purpose of positioning and aligning optical fibers at a fixed pitch; comprising:

a plurality of concavities that extend in one direction in the forming surface; wherein the tangent lines at the points where the portions that are to support said optical fibers at the two sloping surfaces which configure said concavities, in a cross-section that is perpendicular to the longitudinal dimension of said concavities, subtend an angle θ that is equal to or smaller than θc which satisfies the relationship noted below;

the perpendicular cross-sectional shape of said concavities is such that the contour thereof is contained within an area bounded by two tangent lines that touch the sloping surfaces and by a line that is tangent to an imaginary circle and perpendicular to the straight line connecting the intersection of said two tangent lines with the center of said imaginary circle, and that passes between said intersection and said center of said imaginary circle, when said imaginary circle, of radius Rmin as defined below, is inscribed in the area that is in the bight of said two tangent lines;

the depth of said concavities is such that said intersection of said two tangent lines is at a position deeper than dmin, as defined below; and said forming surfaces between said concavities are what form said optical fiber engagement portions:

$$\theta c = 2\tan^{-1}\{S^2-1)/2S\},$$

where:
S=YO/RO;

$$\text{Rmin} = [RO + \{RO/\sin(\theta/2)\} - \{YO/\tan(\theta/2)\}]/[1-\{1/\sin(\theta/2)\}];$$

$$\text{dmin} = [YO - RO \cdot \tan\{(\pi-\theta)/4\}]/\tan(\theta/2);$$

RO is the optical fiber radius; and
YO is half the pitch length of the optical fiber engagement portion.

2. The mold for fabricating optical fiber guide blocks, according to claim 1, wherein the cross-sectional shapes perpendicular to the longitudinal dimension of a plurality of concavities are the same.

3. A mold for fabricating optical fiber guide blocks, for the purpose of molding, by press-molding process, at least the optical fiber engagement portions of an optical fiber guide block that comprises groove-shaped optical fiber engagement portions for the purpose of positioning optical fibers; comprising:

convexities that extend in the longitudinal dimension of the forming surface; and concavities that extend in the longitudinal dimension, arrayed with said convexities sandwiched in between them; wherein the tangent lines at the points where are formed the portions of the two sloping surfaces that configure said concavities in a cross-section perpendicular to the longitudinal dimension of said concavities, which portions are to support said optical fibers, subtend an angle θ that is equal to or smaller than θc which satisfies the relationship noted below;

the perpendicular cross-sectional shape of said concavities is such that the contour thereof is contained within an area bounded by the two tangent lines that touch said sloping surfaces and by a line that is tangent to an imaginary circle and perpendicular to the straight line connecting the intersection of said two tangent lines with the center of said imaginary circle, and that passes between said intersection and said center of said imaginary circle, when said imaginary circle, of radius Rmin as defined below, is inscribed in the area that is in the bight of said two tangent lines;

the depth of said concavities is such that said intersection of said two tangent lines is at a position deeper than dmin, as defined below; and one or other of said sloping surfaces that form said concavities is what forms the surfaces that support said optical fibers in said optical fiber engagement portions:

θc=2 tan$^{-1}${S$^2$−1)/2S}, where:
S=YO/RO;

Rmin=[RO+{RO/sin(θ/2)}−{YO/tan (θ/2)}]/[1−{1/sin(θ/2)}];

dmin=[YO−RO·tan{(π−θ)/4}]/tan(θ/2);

RO is the optical fiber radius; and
2YO is the interval between the concavities arrayed so as to sandwich the convexities between them.

4. The mold for fabricating optical fiber guide blocks, according to claim 3, wherein the cross-sectional shapes perpendicular to the longitudinal dimension of said concavities are the same.

5. The mold for fabricating optical fiber guide blocks, according to claims 1, wherein Rmin*, which satisfies the relationship noted below, applies instead of Rmin:

Rmin*=Rmin−(φ/5), where:
φ is the optical fiber core diameter.

6. A mold for fabricating optical fiber guide blocks, for the purpose of molding, by press-molding process, at least the optical fiber engagement portions of an optical fiber guide block comprising optical fiber engagement portions for the purpose of positioning and aligning optical fibers at a fixed pitch; comprising:

a plurality of concavities that extend in one direction in the forming surface; wherein the tangent lines at the points where the portions that are to support said optical fibers at the two sloping surfaces which configure the concavities, in a cross-section that is perpendicular to the longitudinal dimension of said concavities, subtend an angle θ that exceeds θc which satisfies the relationship noted below;

the depth of said concavities is such that said intersection of said tangent lines is at a position deeper than dmin, as defined below; and the forming surfaces between said concavities are what form said optical fiber engagement portions:

θc=2 tan$^{-1}${S$^2$−1)/2S}, where:
S=YO/RO;

dmin=[YO−RO·tan{(π−θ)/4}]/tan(θ/2);

RO is the optical fiber radius; and
YO is half the pitch length of the optical fiber engagement portion.

7. The mold for fabricating optical fiber guide blocks, according to claim 6, wherein the cross-sectional shapes perpendicular to the longitudinal dimension of a plurality of concavities are the same.

8. A mold for fabricating optical fiber guide blocks, for the purpose of molding, by press-molding process, at least the optical fiber engagement portions of an optical fiber guide block that comprises groove-shaped optical fiber engagement portions for the purpose of positioning and supporting optical fibers; comprising:

convexities that extend in the longitudinal dimension of the forming surface; and concavities that extend in the longitudinal dimension, arrayed with the convexities sandwiched in between them; wherein the tangent lines at the points where are formed the portions of the two sloping surfaces that configure said concavities in a cross-section perpendicular to the longitudinal dimension of said concavities, which portions are to support said optical fibers, subtend an angle θ that exceeds θc which satisfies the relationship noted below;

the depth of said concavities is such that the intersection of said tangent lines is at a position deeper than dmin, as defined below; and one or other of the sloping surfaces that form the concavities is what forms the surfaces that support said optical fibers in the optical fiber engagement portions:

θc=2tan$^{-1}${S$^2$−1)/2S}, where:
S=YO/RO;

dmin=[YO−RO·tan{(π−θ)/4}]/tan(θ/2);

RO is the optical fiber radius; and
2YO is the interval between the concavities arrayed so as to sandwich the convexities between them.

9. The mold for fabricating optical fiber guide blocks, according to claim 8, wherein each of the cross-sectional shapes perpendicular to the longitudinal dimension of said concavities is identical with one another.

10. The mold for fabricating optical fiber guide blocks, according to claim 1, wherein the shapes of the bottoms of said concavities in a cross-section perpendicular to the longitudinal dimension of said concavities are arcuate in configuration.

11. The mold for fabricating optical fiber guide blocks, according to claim 1, wherein the bottoms of said concavities are flat.

12. The mold for fabricating optical fiber guide blocks, according to claim 1 comprising: a plurality of concavities, wherein the forming surfaces bounded between said concavities are flat; and said flat surfaces are positioned in the same plane.

13. The mold for fabricating optical fiber guide blocks, according to claim 1, comprising: a mold release thin film(s), at least on the forming surfaces.

14. A method of fabricating optical fiber guide blocks wherein a mold for fabricating optical fiber guide blocks, according to claim 1 is used; and the raw material to be molded is press-molded under heat.

15. The mold for fabricating optical fiber guide blocks, according to claim 3, wherein Rmin*, which satisfies the relationship noted below, applies instead of Rmin:

$$Rmin^* = Rmin - (\phi/5),$$

where:

$\phi$ is the optical fiber core diameter.

16. The mold for fabricating optical fiber guide blocks, according to claim 3, wherein the shapes of the bottoms of said concavities in a cross-section perpendicular to the longitudinal dimension of said concavities are arcuate in configuration.

17. The mold for fabricating optical fiber guide blocks, according to claim 6, wherein the shapes of the bottoms of said concavities in a cross-section perpendicular to the longitudinal dimension of said concavities are arcuate in configuration.

18. The mold for fabricating optical fiber guide blocks, according to claim 8, wherein the shapes of the bottoms of said concavities in a cross-section perpendicular to the longitudinal dimension of said concavities are arcuate in configuration.

19. The mold for fabricating optical fiber guide blocks, according to claim 3, wherein the bottoms of said concavities are flat.

20. The mold for fabricating optical fiber guide blocks, according to claim 6, wherein the bottoms of said concavities are flat.

21. The mold for fabricating optical fiber guide blocks, according to claim 8, wherein the bottoms of said concavities are flat.

22. The mold for fabricating optical fiber guide blocks, according to claim 3 comprising:

a plurality of concavities, wherein the forming surfaces bounded between said concavities are flat; and said flat surfaces are positioned in the same plane.

23. The mold for fabricating optical fiber guide blocks, according to claim 6 comprising:

a plurality of concavities, wherein the forming surfaces bounded between said concavities are flat; and said flat surfaces are positioned in the same plane.

24. The mold for fabricating optical fiber guide blocks, according to claim 8 comprising:

a plurality of concavities, wherein the forming surfaces bounded between said concavities are flat; and said flat surfaces are positioned in the same plane.

25. The mold for fabricating optical fiber guide blocks, according to claim 3 comprising:

a mold release thin film(s), at least on the forming surfaces.

26. The mold for fabricating optical fiber guide blocks, according to claim 6 comprising:

a mold release thin film(s), at least on the forming surfaces.

27. The mold for fabricating optical fiber guide blocks, according to claim 8 comprising:

a mold release thin film(s), at least on the forming surfaces.

* * * * *